ERROR DETECTING AND CORRECTING SYSTEMS

Filed June 22, 1961 6 Sheets-Sheet 1

INVENTOR.
JACOB F. KLINKHAMER
BY
FRASER and BOGUCKI
ATTORNEYS

Dec. 7, 1965 J. F. KLINKHAMER 3,222,643

ERROR DETECTING AND CORRECTING SYSTEMS

Filed June 22, 1961 6 Sheets-Sheet 2

INVENTOR.
JACOB F. KLINKHAMER
BY
FRASER and BOGUCKI
ATTORNEYS

Dec. 7, 1965 J. F. KLINKHAMER 3,222,643

ERROR DETECTING AND CORRECTING SYSTEMS

Filed June 22, 1961 6 Sheets-Sheet 3

FIG. 3

ENCODING OF:

| $D_9$ | $D_8$ | $D_7$ | $D_6$ | $D_5$ | $D_4$ | $D_3$ | $D_2$ | $D_1$ |
|---|---|---|---|---|---|---|---|---|
| 0 | 1 | 0 | 1 | 0 | 0 | 1 | 1 | 0 |

| $P_3$ | $P_2$ | $P_1$ | $P_4$ | $\rho_1$ | $D_9$ | $D_8$ | $D_7$ | $\rho_2$ | $D_6$ | $D_5$ | $D_4$ | $D_3$ | $D_2$ | $D_1$ |
|---|---|---|---|---|---|---|---|---|---|---|---|---|---|---|
| 0 | 1 | 1 | 0 | 1 | 0 | 1 | 0 | 0 | 1 | 0 | 0 | 1 | 1 | 0 |

| CLOCK PULSE | SHIFT PULSE | IN BITS | $F_1$ $F_2$ $F_3$ $F_4$ | $P_1$ $P_2$ $P_3$ $P_4$ | $G_1$ $G_2$ | $\rho_1$ $\rho_2$ | SHIFT REGISTER 1 | 2 | 3 | 4 | 5 | 6 | 7 | 8 | 9 | OUT BITS |
|---|---|---|---|---|---|---|---|---|---|---|---|---|---|---|---|---|
| START | | | 0 0 1 0 | 0 0 0 0 | 1 1 | 0 0 | - | - | - | - | - | - | - | - | - | |
| | 1 | | 1 0 0 1 | | 0 1 | | | | | | | | | | | |
| 1 | | D - 0 | | 0 0 0 0 | | 0 0 | 0 | - | - | - | - | - | - | - | - | |
| | 2 | | 1 1 0 0 | | 1 0 | | | | | | | | | | | |
| 2 | | D - 1 | | 1 1 0 0 | | 1 0 | 1 | 0 | - | - | - | - | - | - | - | |
| | 3 | | 0 1 1 0 | | 1 1 | | | | | | | | | | | |
| 3 | | D - 1 | | 1 0 1 0 | | 0 1 | 1 | 1 | 0 | - | - | - | - | - | - | |
| | 4 | | 1 0 1 1 | | 0 1 | | | | | | | | | | | |
| 4 | | D - 0 | | 1 0 1 0 | | 0 1 | 0 | 1 | 1 | 0 | - | - | - | - | - | |
| | 5 | | 0 1 0 1 | | 1 0 | | | | | | | | | | | |
| 5 | | D - 0 | | 1 0 1 0 | | 0 1 | 0 | 0 | 1 | 1 | 0 | - | - | - | - | |
| | 6 | | 1 0 1 0 | | 1 1 | | | | | | | | | | | |
| 6 | | D - 1 | | 0 0 0 0 | | 1 0 | 1 | 0 | 0 | 1 | 1 | 0 | - | - | - | |
| | 7 | | 1 1 0 1 | | 0 1 | | | | | | | | | | | |
| 7 | | – | | – – – – | | – – | - | 1 | 0 | 0 | 1 | 1 | 0 | - | - | |
| | 8 | | 1 1 1 0 | | 1 0 | | | | | | | | | | | |
| 8 | | D - 0 | | 0 0 0 0 | | 1 0 | 0 | - | 1 | 0 | 0 | 1 | 1 | 0 | - | |
| | 9 | | 1 1 1 1 | | 1 1 | | | | | | | | | | | |
| 9 | | D - 1 | | 1 1 1 1 | | 0 1 | 1 | 0 | - | 1 | 0 | 0 | 1 | 1 | 0 | |
| | 10 | | 0 1 1 1 | | 0 1 | | | | | | | | | | | |
| 10 | | D - 0 | | | | 0 1 | 0 | 1 | 0 | - | 1 | 0 | 0 | 1 | 1 | $D_1$ - 0 |
| | 11 | | 0 0 1 1 | | 1 0 | | | | | | | | | | | |
| 11 | | – | | | | – – | - | 0 | 1 | 0 | - | 1 | 0 | 0 | 1 | $D_2$ - 1 |
| | 12 | | 0 0 0 1 | | 1 1 | | | | | | | | | | | |
| 12 | | $p_4'$ - 1 | | | | 1 0 | - | - | 0 | 1 | 0 | - | 1 | 0 | 0 | $D_3$ - 1 |
| | 13 | | 1 0 0 0 | | 0 1 | | | | | | | | | | | |
| 13 | | $p_1'$ - 1 | | | | 1 1 | - | - | - | 0 | 1 | 0 | - | 1 | 0 | $D_4$ - 0 |
| | 14 | | 0 1 0 0 | | 1 0 | | | | | | | | | | | |
| 14 | | $p_2'$ - 1 | | | | 0 1 | - | - | - | - | 0 | 1 | 0 | - | 1 | $D_5$ - 0 |
| | 15 | | 0 0 1 0 | | 1 1 | | | | | | | | | | | |
| 15 | | $p_3'$ - 1 | | | | 1 0 | - | - | - | - | - | 0 | 1 | 0 | - | $D_6$ - 1 |
| | 16 | | | | | | | | | | | | | | | |
| 16 | | ADD $\rho_1$=1 | TO $p_3'$, $p_4'$ | 1 1 0 0 | | | - | - | - | - | - | - | 0 | 1 | 0 | $\rho_2$ - 0 |
| | 17 | | | | | | | | | | | | | | | |
| 17 | | ADD $\rho_2$=0 | TO $p_1'$, $p_2'$, $p_4'$ | 1 1 0 0 | | | - | - | - | - | - | - | - | 0 | 1 | $D_7$ - 0 |
| | 18 | | | | | | | | | | | | | | | |
| 18 | | | | | | | - | - | - | - | - | - | - | - | 0 | $D_8$ - 1 |
| | 19 | | | | | | | | | | | | | | | |
| 19 | | | | | | | - | - | - | - | - | - | - | - | - | $D_9$ - 0 |
| | 20 | | | | | | | | | | | | | | | |
| 20 | | | | | | | | | | | | | | | | $\rho_1$ - 1 |
| | 21 | | | | | | | | | | | | | | | |
| 21 | | | | | | | | | | | | | | | | $p_4$ - 0 |
| | 22 | | | | | | | | | | | | | | | |
| 22 | | | | | | | | | | | | | | | | $p_1$ - 1 |
| | 23 | | | | | | | | | | | | | | | |
| 23 | | | | | | | | | | | | | | | | $p_2$ - 1 |
| | 24 | | | | | | | | | | | | | | | |
| 24 | | | | | | | | | | | | | | | | $p_3$ - 0 |

| | $D_1$ | $D_2$ | $D_3$ | $D_4$ | $D_5$ | $D_6$ | $\rho_2$ | $D_7$ | $D_8$ | $D_9$ | $\rho_1$ | $p_4$ | $p_1$ | $p_2$ | $p_3$ |
|---|---|---|---|---|---|---|---|---|---|---|---|---|---|---|---|
| $k_1$ | X | X | | X | | X | X | X | X | | | | X | | |
| $k_2$ | | X | X | | X | | X | X | X | X | | | | X | |
| $k_3$ | | | X | X | | X | | X | X | X | X | | | | X |
| $k_4$ | X | | | X | X | | X | | X | X | X | X | | | |
| $\Pi_1$ | | X | X | | X | X | | X | X | | X | X | | X | X |
| $\Pi_2$ | X | | X | X | | X | X | | X | X | | X | X | | X |

FIG. 4

INVENTOR.

BY JACOB F. KLINKHAMER

FRASER and BOGUCKI

ATTORNEYS

INVENTOR.
JACOB F. KLINKHAMER
BY
FRASER and BOGUCKI
ATTORNEYS

INVENTOR.
JACOB F. KLINKHAMER
BY
FRASER and BOGUCKI
ATTORNEYS

INVENTOR.
JACOB F. KLINKHAMER
BY
FRASER and BOGUCKI
ATTORNEYS

United States Patent Office 3,222,643

Patented Dec. 7, 1965

3,222,643
ERROR DETECTING AND CORRECTING SYSTEMS

Jacob Fredrik Klinkhamer, Emmasingel, Eindhoven, Netherlands, assignor to International Business Machines Corporation, New York, N.Y., a corporation of New York Filed June 22, 1961, Ser. No. 118,927
11 Claims. (Cl. 340—146.1)

This invention relates to systems for detecting, locating and correcting errors in binary coded information, and in particular to systems for detecting, locating and correcting a number of types of related errors in information which is transmitted between separate points.

A number of arrangements have been suggested in the prior art for checking coded information. These arrangements have usually utilized a parity check principle, in that they have added one or more parity or check digits to a group of coded digits to provide a selected digital sum by which errors may be identified. With a binary system, for example, a parity digit may be used with a group of information digits, and the parity digit may be varied so that the sum of all the digits, including the parity digit itself, is either odd or even. With an even parity check, therefore, the presence of an odd total in the information digits plus the parity digit indicates that an error has occurred.

The redundancy factor introduced by a single parity digit is not sufficient to detect the existance of a number of different types of errors. Accordingly, there have been developed a number of other error detecting and correcting systems which utilize a considerable number of parity digits. Each of the parity digits in such systems may be associated with a selected combination of information digits and other parity digits, so as to provide means by which the location of errors may be ascertained and the information group of digits may be restored to the original information sequence.

Particularly difficult conditions are presented for error detecting and correcting systems when the type of error which might occur involves bursts of errors which encompass a number of successive digits. Such conditions are encountered very often when digital data is transmitted between two points, it being found that under such circumstances the conditions are such that an error in one digital position greatly increases the likelihood that there may be an error at adjacent positions. It is highly desirable for such systems to be able to detect, locate and correct bursts of errors, with the use of a minimum number of redundant digits.

It is therefore an object of the present invention to provide an improved system for detecting, locating and correcting errors in binary information.

Another object of the present invention is to provide an improved system for correcting multiple adjacent errors in coded information.

Another object of the present invention is to provide an improved arrangement for correcting error bursts in transmitted binary digital data with relatively simple and inexpensive circuit arrangements.

Another object of the present invention is to provide an error correcting system in which particularly efficient circuit arrangements are employed to correct a predetermined number of different errors.

The present invention provides systems which operate to detect, locate and correct errors in binary coded information, which errors occur in multiple and related groupings. Systems in accordance with the present invention utilize two distinct sets of parity bits in conjunction with an information code group. One set of parity bits, referred to as error type parity bits, is employed in determining the type of error; the other set is referred to as locator parity bits and is employed in determining the location of the error. The bit positions checked by each locator parity bit are determined in accordance with a first m-sequence, the term m-sequence being defined below, while the bit positions checked by each error type parity bit are determined by a second m-sequence. On receipt of the information code group, together with the error type parity bits and the locator parity bits, the system goes through a predetermined sequence to identify both the nature and the location of the related errors which occurred, and corrects the data to restore the original correct message.

A specific example of a system in accordance with the invention is provided by a system which transmits binary digital information by telephone line communications. The information bits and the parity bits are transmitted, as modified by whatever related errors may occur, to a receiver, at which m-sequence check-sums are built up which contain information as to the nature of the errors and their location. The m-sequences which are used are selected to satisfy particular conditions, and thereby avoid ambiguities. The check-sums are entered into a locator sequence generator and an error type sequence generator, which are then simultaneously run through successive states while the data is recirculated through a register in the opposite direction. With the selected m-sequence pairs, each error pattern which can be corrected results in unique relationships between selected locator generator states and the error type generator states. Through the use of converters, the two states may be compared for identification of the location and nature of the error pattern. The concurrent shifting of the data causes the parts of a message which have been injured by an error burst to be placed at a standard position in the data buffer register when the error pattern is located. The injured parts of the data are then restored by the addition of a proper correction pattern.

The foregoing and other objects, features and advantages of the invention will be apparent from the following more particular description of preferred embodiments of the invention, as illustrated in the accompanying drawings.

FIG. 3 is a tabulation of coded information useful in explaining the operation of the system of FIG. 2;

FIG. 4 is a tabulation representing a parity check table useful in describing the operation of the system;

INTRODUCTION

Figure 1:
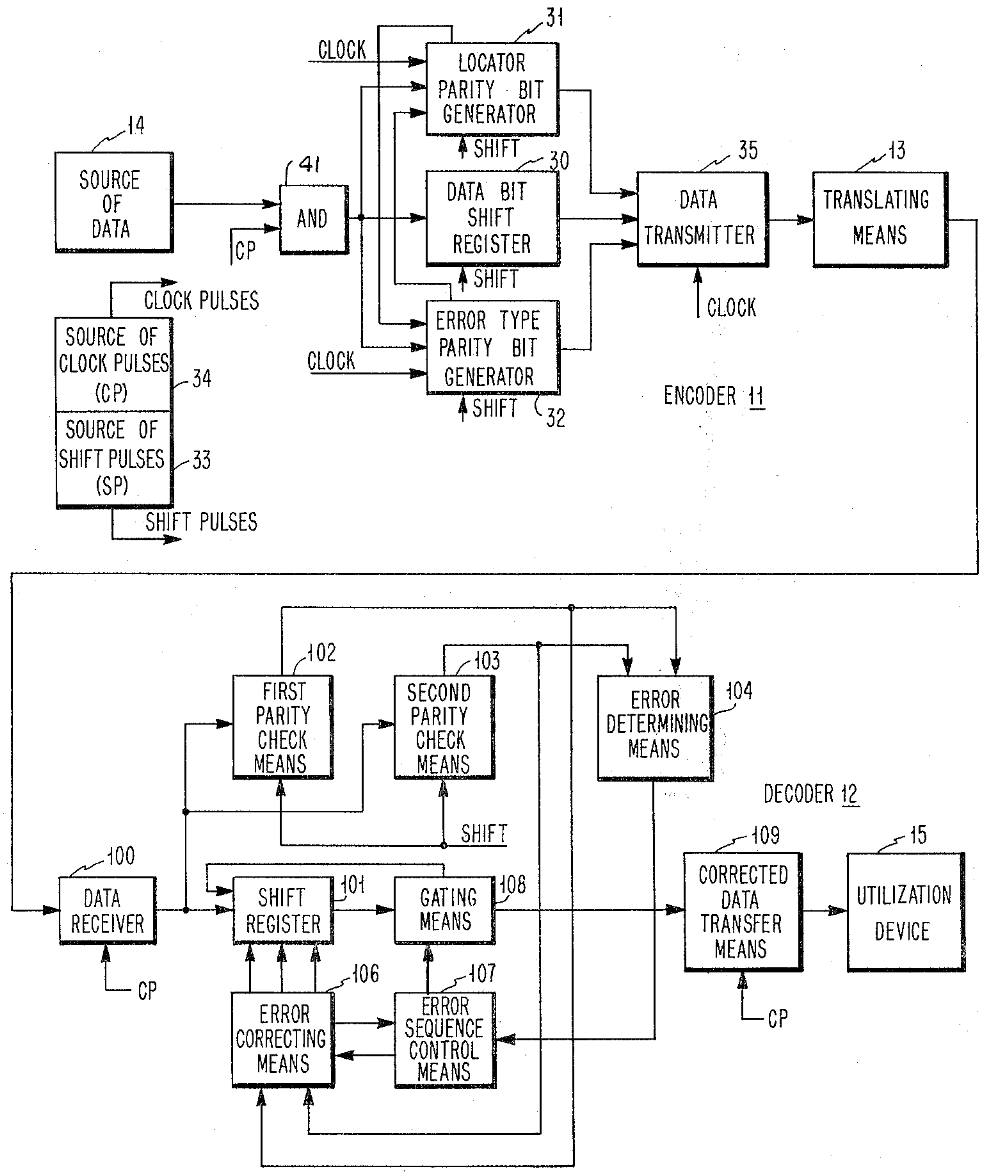
FIG. 1 is a block diagram of a system in accordance with the invention for translating data between two points, including a transmitting station and a receiving station.

An example of an error correcting system known in the prior art is represented by the system disclosed by Hamming et al. in U.S. Reissue Patent No. 23,601 (U.S. 2,552,629). The theory of the Hamming code for single error correction may be readily understood by an analysis of a so-called parity check table. A parity check table corresponding to Table 2 in the above-mentioned reissue patent is reproduced below for convenience, with a slight modification of certain of the terms which are employed ($p$ is hereafter used to refer to a parity digit, and $k$ to a check-sum digit).

*Table 1*

| Check-sum bit | Check-sum or locator subword | Code group position | | | | | | |
|---|---|---|---|---|---|---|---|---|
| | | $p_1$ | $p_2$ | $p_3$ | $D_1$ | $D_2$ | $D_3$ | $D_4$ |
| | | Bits | | | | | | |
| | | 1 | 2 | 3 | 4 | 5 | 6 | 7 |
| 1 | $k_1$ | X | | | X | X | | X |
| 2 | $k_2$ | | X | | X | | X | X |
| 3 | $k_3$ | | | X | | X | X | X |

In the example represented by the above table, a group of seven binary digit (hereinafter bit) positions is assumed. In the seven bit positions, $D_1$ to $D_4$ represent data bit positions, and $p_1$ to $p_3$ represent parity bit positions. The "X's" in this table conveniently indicate that parity bit $p_1$ checks bit positions 1, 4, 5 and 7; parity bit $p_2$ checks bit positions 2, 4, 5 and 7; and parity bit $p_3$ checks bit positions 3, 5, 6 and 7.

If this code group of seven bits is transmitted from one point to another, and translated correctly at the receiving point, a check-sum bit may then be generated for each of the parity bit code groupings shown in Table 1. If an even parity check is employed, each of these check-sums, which are the individual bits of a locator subword $k_1$ to $k_3$ (referred to by Hamming as the parity subgroup) will all total 0. However, if one bit of the translated code group is received in error, the locator subword bits $k_1$ to $k_3$ will not be all 0's, and hence a single error is readily detected. The particular bit position in which the detected error is located in the code group is indicated by the condition or binary count of the locator subword $k_1$ to $k_3$. The locator subword combinations and the respective bit positions in the code group which the locator subword combinations indicate are in error are tabulated below for convenience as Table 2, and correspond to Table 4 in the above-mentioned reissue patent.

*Table 2*

| | Error in bit position | Locator subword | | |
|---|---|---|---|---|
| | | $k_3$ | $k_2$ | $k_1$ |
| 1 | $p_1$ | 0 | 0 | 1 |
| 2 | $p_2$ | 0 | 1 | 0 |
| 3 | $p_3$ | 1 | 0 | 0 |
| 4 | $D_1$ | 0 | 1 | 1 |
| 5 | $D_2$ | 1 | 0 | 1 |
| 6 | $D_3$ | 1 | 1 | 0 |
| 7 | $D_4$ | 1 | 1 | 1 |
| | No errors | 0 | 0 | 0 |

The above table may be referred to as the locator subword table, and is based upon the following reasoning, which may be construed by reference to the parity check Table 1. To locate a particular bit position whose value has been received in error a reception parity check must be made over the same selected bit positions used in initially determining the value of each parity bit $p_1$ to $p_3$. In doing this, we build up the three (in this example) check-sums or bit positions of the locator subword. If a correct parity is received over the selected bit positions associated with each of the parity bits, the locator subword bits $k_1$ to $k_3$ are all 0's. If an error occurs in bit position 1, $p_1$ is affected and becomes a 1 while $p_2$ and $p_3$ are not affected because these parity bits do not check bit position 1 of the initial data. Hence, the locator subword for an error bit in bit position 1 is 100. Similarly, the locator subword for an error in bit position 2 is 010, and for an error in bit position 3, 001. An error in bit position 4 affects both $p_1$ and $p_2$, so that the locator subword for an error in this bit position becomes 110. Similar reasoning may be employed to show that single errors in bit positions 5, 6 and 7 result in the locator subwords shown in Table 2. The obtaining of different locator subwords for indicating the bit position where a single error occurs is the basic concept upon which the Hamming error-correcting system is based.

The prior art also suggests systems for detecting or correcting multiple errors. For example, Hamming in the reissue patent mentioned above further discloses a system which corrects single errors and detects double errors. The parity check table for the Hamming system which corrects single errors and detects double errors is shown below as Table 3.

*Table 3*

| Parity bit | Locator subword | Code group position | | | | | | | |
|---|---|---|---|---|---|---|---|---|---|
| | | $p_1$ | $p_2$ | $p_3$ | $D_1$ | $D_2$ | $D_3$ | $D_4$ | $p_4$ |
| | | Bits | | | | | | | |
| | | 1 | 2 | 3 | 4 | 5 | 6 | 7 | 8 |
| 1 | $k_1$ | X | | | X | X | | X | |
| 2 | $k_2$ | | X | | X | | X | X | |
| 3 | $k_3$ | | | X | | X | X | X | |
| 4 | $k_4$ | X | X | X | X | X | X | X | X |

The parity check table shown in Table 3 is identical to the parity check table shown in Table 1, except for the addition of an eighth bit position to the code group, and a $p_4$ parity bit. Parity bits $p_1$, $p_2$ and $p_3$ check the same bit positions as in Table 1. The $p_4$ parity bit, referred to as the "all check parity bit," checks each of the eight bit positions.

The locator subwords (Hamming's parity subgroups) for errors in particular bit positions are tabulated below in Table 4, which corresponds to Table 6 of the reissue patent.

*Table 4*

| | Error in bit position | Locator subword | | | |
|---|---|---|---|---|---|
| | | $k_4$ | $k_3$ | $k_2$ | $k_1$ |
| 1 | $p_1$ | 1 | 0 | 0 | 1 |
| 2 | $p_2$ | 1 | 0 | 1 | 0 |
| 3 | $p_3$ | 1 | 1 | 0 | 0 |
| 4 | $D_1$ | 1 | 0 | 1 | 1 |
| 5 | $D_2$ | 1 | 1 | 0 | 1 |
| 6 | $D_3$ | 1 | 1 | 1 | 0 |
| 7 | $D_4$ | 1 | 1 | 1 | 1 |
| 8 | $p_4$ | 1 | 0 | 0 | 0 |
| | No errors | 0 | 0 | 0 | 0 |

If there are no errors in a code group after it is translated, all of the parity conditions will be satisfied when the check-sums are tabulated, and the locator subword will be 0000. When a single error occurs in any bit position of the code group, two separate indications are obtained. First, the all check parity condition will not be met, and therefore the all bit check-sum $k_4$ becomes a 1 indicating a single error. Second, the $k_1$ to $k_3$ check-sum bits of the locator subword will indicate the location of the single error, the 000 value of $k_1$ to $k_3$ now indicating an error in the eighth bit position of the code group. If, on the other hand, two errors have occurred, the all check parity condition is satisfied and the check-sum bit $k_4$ is 0, but at least one of the check-sum bits $k_1$, $k_2$ or $k_3$ will not be 0. Stated somewhat differently, reference to Table 4 enables the determination of whether a single error has been made, by looking at the locator subword consisting of the $k_1$ to $k_4$ check-sum bits. If the bits of the locator subword are not all 0's, a single or double error has been made. If the $k_4$ check-sum bit is a 1, this indicates a single error, and check-sum bits $k_1$ to $k_3$ indicate the bit position in the code group where the single error has occurred. If, on the other hand, check-sum bit $k_4$ is 0 and one or more of the check-sum bits $k_1$ to $k_3$ are 1, this indicates that two errors have been made. No information is available, however, as to the location of the two errors. This system is therefore referred as a single error correcting-double error detecting system.

The prior art also discloses an arrangement for correcting single errors and double adjacent errors. A description of the type of code which is used in such a system may be found in Technical Report No. 51 dated December 30, 1958 by N. M. Abramson entitled "A Class of Systematic Codes for Non-Independent Errors," published by Stanford University, Stanford, California. In FIG. 1 of this report a parity check table is illustrated employing a code group of seven bit positions consisting of four parity bit positions and three data positions. The table is reproduced as Table 5 immediately below for convenience.

*Table 5*

| Parity bit | Locator subword | Code group position | | | | | | |
|---|---|---|---|---|---|---|---|---|
| | | $D_1$ | $D_2$ | $D_3$ | $p_1$ | $p_2$ | $p_3$ | $p_0$ |
| | | Bits | | | | | | |
| | | 1 | 2 | 3 | 4 | 5 | 6 | 7 |
| 1 | $k_1$ | X | X | | X | | | |
| 2 | $k_2$ | | X | X | | X | | |
| 3 | $k_3$ | | | X | X | | X | |
| 4 | $k_0$ | X | X | X | X | X | X | X |

This table indicates that:

$k_1$ checks bit positions 1, 2 and 4 ($D_1$, $D_2$ and $p_1$)
$k_2$ checks bit positions 2, 3 and 5 ($D_2$, $D_3$ and $p_2$)
$k_3$ checks bit positions 3, 4 and 6 ($D_3$, $D_4$ and $p_3$)
$k_0$ checks bit positions 1 through 7 ($D_1$ through $p_0$).

The main distinguishing feature between the Abramson parity check table as shown in Table 5 and the parity check table disclosed by Hamming (Table 3 herein) is that the bit positions checked by each check-sum bit $k_1$ to $k_4$ in the Hamming table are arranged arbitrarily after two conditions are met in the parity check table for the single error correcting system. As explained by Hamming, the first condition is that each bit position of the code group or "word" must be in a check-sum group which determines one of the bits in the locator subword. The second condition is that each bit position of the code group must have a different combination of parity bits $p_1$ to $p_4$.

In the parity check table (Table 5) disclosed by Abramson the two conditions of the Hamming parity check table are met, but a third condition must also be satisfied. This third condition is that the bit positions to which a parity bit is related are determined in accordance with an m-sequence. The term m-sequence is known in the art and may be defined by the output signal sequence provided from one stage of a maximal length binary shift register having R stages. An m-sequence is merely a unique series of 0's and 1's of $2^R-1$ binary digits arranged in a predetermined order. A true m-sequence satisfies the condition that:

$$a_{t+R}=\sum_{j=1}^{R}C_j a_{t+(j-1)} \qquad (1)$$

where $2^R-1$ is the number of binary digits in a sequence before it repeats itself. The above equation may also be expressed as $$a_{t+R}=C_1a_t+C_2a_{t+1}+C_3a_{t+2}\ \ldots\ C_Ra_{t+R-1} \qquad (2)$$

where $C_1$–$C_R$ each represent a binary coefficient 0 or 1 determined from reference tables referred to as a "Table of Irreducible Polynomials over Galois Field (2) through Degree 19," by R. W. Marsh, a publication of the National Security Agency dated October 24, 1957. Coefficients $C_1$ to $C_R$ in effect determine the feedback path of the maximal length binary shift register.

The number of different m-sequences that are obtained from an R stage maximal length binary shift register is tabulated below.

*Table 6*

| | | | | | | | | | |
|---|---|---|---|---|---|---|---|---|---|
| Number of stages | R=2 | 3 | 4 | 5 | 6 | 7 | 8 | 9 | 10 |
| Different m-sequences | 1 | 2 | 2 | 6 | 6 | 18 | 16 | 48 | 60 |

The number of different m-sequences obtained from an R stage m-sequence generator also corresponds to the number of different groups of coefficients $C_1$ to $C_R$ which are available for m-sequences.

From the above table it will be seen that two different m-sequences may be obtained from a four-stage maximal length linear binary shift register. When $C_1$ to $C_R$ correspond respectively to 1100, the following m-sequence is obtained:

1 2 3 4 5 6 7 8 9 10 11 12 13 14 15
0 1 0 1 1 1 1 0 0 0 1 0 0 1 1

When $C_1$ to $C_R$ is 1001 the other m-sequence is obtained.

1 2 3 4 5 6 7 8 9 10 11 12 13 14 15
0 1 0 1 1 0 0 1 0 0 0 1 1 1 1.

With relation to the general Equation 1 for an m-sequence, the first sequence shown above is expressed specifically as $a_{t+4}=a_t+a_{t+1}$. In non-mathematical language, this specific equation expresses the fact that the value of the fifth binary digit $(a_{t+4})$=the mod. 2 sum of the values of the first binary digit $(a_t)$ and the second binary digit $(a_{t+1})$. For example, the fifth digit in the first m-sequence which is given above is obtained by binary addition (mod. 2) of the first digit (0) and the second digit (1). The succeeding digits of the m-sequence are obtained in the same manner until $2^R-1$, or a total of fifteen, digits are obtained. The m-sequence then repeats itself.

The second m-sequence given above is obtained in a similar manner, but because the coefficients $C_1$ to $C_R$ are different, or 1001, the specific equation becomes $a_{t+4}=a_t+a_{t+3}$. In other words the value of the first digit (0) plus the value of the fourth digit (1) will give the value of the fifth digit (1).

It was stated previously that the primary distinction between the systems of Hamming and Abramson was that the Abramson parity check table must satisfy the additional condition that the bit positions checked by a parity bit are determined by an m-sequence. The bit positions checked by parity bit $p_1$ of Abramson are shown below (Table 7) in relation to the m-sequence for a three-stage m-sequence generator and also in relation to an m-sequence which is merely the complement of the true m-sequence. That is, in the inverse m-sequence each of the bit positions is the complement of the digit in the bit position of the true m-sequence.

*Table 7*

| Bit position | 1 | 2 | 3 | 4 | 5 | 6 | 7 |
|---|---|---|---|---|---|---|---|
| | $D_1$ | $D_2$ | $D_3$ | $p_1$ | $p_2$ | $p_3$ | $p_0$ |
| $p_1$ | X | X | 0 | X | 0 | 0 | 0 |
| m-Sequence for R=3 | 0 | 0 | 1 | 0 | 1 | 1 | 1 |
| Inverse m-sequence | 1 | 1 | 0 | 1 | 0 | 0 | 0 |

It will be noted that parity bit $p_1$ is in a grouping which corresponds to the grouping of the bit positions indicated by the binary bits of the inverse m-sequence. It will also be noted, from Table 5 above, that parity bit $p_2$ is in a code grouping which checks bit positions corresponding to the same inverse m-sequence, but one which is shifted to the right by one position relative to parity bit $p_1$. Also, parity bit $p_3$ is in a code grouping which checks bit positions corresponding to the same inverse m-sequence also, but one which is shifted to the right by an additional bit position relative to the code grouping for parity bit $p_2$.

The fact that the bit positions which are checked above in Table 7 and in Table 5 follow an inverse m-sequence results in a fairly simple single error correction system, in that the locator subwords may be readily stored in a three-stage maximal length binary shift register. In addition to this simplification of the system, the arrangement of the parity check table allows correction of double adjacent errors in that errors in successive pairs of bit positions (1 and 2, 2 and 3, 3 and 4, and so forth) cause a group of locator subwords to be generated corresponding to the true m-sequence originally employed, but which is shifted a fixed amount relative to the original m-sequence. This is shown in Table 8 below by representing the locator subwords for single errors and double errors in a 7-bit code group.

*Table 8*

| Error in bit position | Locator subword | | | Complement of locator subword | | | Error in bit positions | Locator subword | | |
|---|---|---|---|---|---|---|---|---|---|---|
| | $k_3$ | $k_2$ | $k_1$ | $k_3$ | $k_2$ | $k_1$ | | $k_3$ | $k_2$ | $k_1$ |
| 1 | 0 | 0 | 1 | 1 | 1 | 0 | 1–2 | 0 | 1 | 0 |
| 2 | 0 | 1 | 1 | 1 | 0 | 0 | 2–3 | 1 | 0 | 1 |
| 3 | 1 | 1 | 0 | 0 | 0 | 1 | 3–4 | 0 | 1 | 1 |
| 4 | 1 | 0 | 1 | 0 | 1 | 0 | 4–5 | 1 | 1 | 1 |
| 5 | 0 | 1 | 0 | 1 | 0 | 1 | 5–6 | 1 | 1 | 0 |
| 6 | 1 | 0 | 0 | 0 | 1 | 1 | 6–7 | 1 | 0 | 0 |
| 7 | 0 | 0 | 0 | 1 | 1 | 1 | 7–1 | 0 | 0 | 1 |

In Table 8, the locator subwords for double adjacent errors have been obtained by binary addition of the locator subwords for single errors in the affected bit positions. For example, the locator subword for a double adjacent error in bit pisitions 1 and 2 is 010, which is obtained by adding in binary fashion, mod. 2, the locator subword for a single error in bit position 1 (001) to the locator subword (011) for a single error in bit position 2. Table 8 shows also that the complement of each locator subword for a single error corresponds to the locator subword for a double adjacent error starting in another bit position. For example, a single error in bit position 2 has the locator subword 011 ($k_3$, $k_2$ and $k_1$). The complement of this locator subword is 100, which may be seen to correspond to the locator subword 100 which is generated by a double adjacent error in bit positions 6 and 7. This represents a shift of four positions between column 2 and column 4 of Table 8. Abramson shows that the four positional shift relationship is maintained for all the bit positions of the code group, and this fact may be verified by reference to various samples in Table 8. Because the locator subword tables for both single and double adjacent errors are related, they may be generated quite simply by the same maximal length binary shift register.

The process of double error correction, therefore, merely involves first detecting whether no error, a single error or a double adjacent error occurred. A given value of the all check bit $k_0$ in the locator subword for the translated data indicates a single error, while the other value indicates either no error or a double adjacent error. The last ambiguity is resolved, however, because the locator subword $k_1$ to $k_3$ for the no error condition is unique (000) compared to the locator subwords $k_1$ to $k_3$ for double errors, in which $k_1$ to $k_3$ include at least one binary 1.

Single and double adjacent errors may therefore be corrected by the Abramson system, and because it is a systematic approach the Abramson system is quite simple to expand for code groups having any number of elements.

The present invention is directed to the detection, location and correction of multiple related errors, related errors being those which result from the same error producing condition. Depending upon the type of digital data transmission employed, the noise burst can have the effect of reversing the digital values of certain of the digits. For example, if a noise burst appears as a binary 1, each bit position which has a 0 value is changed to a 1. A noise burst signal three bit positions wide can produce the following four types of related errors: a single error (1); a double adjacent error (11); a double non-adjacent error (101); and a triple adjacent error (111). Conversely, an interruption in the data transmission, such as might be caused by switching in a telephone line system, might result in changes from 1 values to 0 values at certain bit positions. Because of the tendency of these noise effects to occur in bursts, a very large percentage of errors which occur during the transmission of binary data are of the related type, and a system which is capable of correcting for such related errors is quite efficient.

Systems in accordance with the present invention use two distinct sets of parity bits, to make possible the location of errors within a received code group, and also to make possible the identification of the error type. One set of parity bits, which check bit positions determined in accordance with a first m-sequence, is referred to as comprising the error type parity bits, while the other set, determined in accordance with a second m-sequence, is referred to as comprising the locator parity bits. An example of the manner in which the present system operates may be seen from the parity check table (Table 9) given immediately below, in which the code group consists of nine information bits $D_1$ to $D_9$, and six parity bits $p_1$–$p_4$ and $\rho_1$–$\rho_2$. In accordance with the the check-sum or locator subward bit designations previously adopted, these give rise to check-sum bits $k_1$–$k_4$ and $\pi_1$–$\pi_2$.

*Table 9*

| Bit position | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | $D_1$ | $D_2$ | $D_3$ | $D_4$ | $D_5$ | $D_6$ | $\rho_2$ | $D_7$ | $D_8$ | $D_9$ | $\rho_1$ | $p_4$ | $p_1$ | $p_2$ | $p_3$ |
| $k_1$ | X | X | ---- | X | ---- | X | X | X | X | ---- | ---- | ---- | X | ---- | |
| $k_2$ | ---- | X | X | ---- | X | ---- | X | X | X | X | ---- | ---- | ---- | X | |
| $k_3$ | ---- | ---- | X | X | ---- | X | ---- | X | X | X | X | ---- | ---- | ---- | X |
| $k_4$ | X | ---- | | X | X | ---- | X | ---- | X | X | X | X | ---- | ---- | |
| $\pi_1$ | ---- | X | X | ---- | X | X | ---- | X | X | ---- | X | X | ---- | X | X |
| $\pi_2$ | X | ---- | X | X | ---- | X | X | ---- | X | X | ---- | X | X | ---- | X |

The locator subwords for the above parity check table are tubulated below as Table 10 for each of the various types of errors which may be corrected.

*Table 10*

| Error starting in bit | 10a 1 | | | | | | 10b 11 | | | | | | 10c 101 | | | | | | 10d 111 | | | | | |
|---|---|---|---|---|---|---|---|---|---|---|---|---|---|---|---|---|---|---|---|---|---|---|---|---|
| | $k_1$ | $k_2$ | $k_3$ | $k_4$ | $\pi_1$ | $\pi_2$ | $k_1$ | $k_2$ | $k_3$ | $k_4$ | $\pi_1$ | $\pi_2$ | $k_1$ | $k_2$ | $k_3$ | $k_4$ | $\pi_1$ | $\pi_2$ | $k$ | $k$ | $k$ | $k$ | $\pi_1$ | $\pi_2$ |
| 1 | 1 | 0 | 0 | 1 | 0 | 1 | 0 | 1 | 0 | 1 | 1 | 1 | 1 | 1 | 1 | 1 | 1 | 0 | 0 | 0 | 1 | 1 | 0 | 0 |
| 2 | 1 | 1 | 0 | 0 | 1 | 0 | 1 | 0 | 1 | 0 | 0 | 1 | 0 | 1 | 1 | 1 | 1 | 1 | 0 | 0 | 0 | 1 | 0 | 0 |
| 3 | 0 | 1 | 1 | 0 | 1 | 1 | 1 | 1 | 0 | 1 | 1 | 0 | 0 | 0 | 1 | 1 | 0 | 1 | 1 | 0 | 0 | 0 | 0 | 0 |
| 4 | 1 | 0 | 1 | 1 | 0 | 1 | 1 | 1 | 1 | 0 | 1 | 1 | 0 | 0 | 0 | 1 | 1 | 0 | 0 | 1 | 0 | 0 | 0 | 0 |
| 5 | 0 | 1 | 0 | 1 | 1 | 0 | 1 | 1 | 1 | 1 | 0 | 1 | 1 | 0 | 0 | 0 | 1 | 1 | 0 | 0 | 1 | 0 | 0 | 0 |
| 6 | 1 | 0 | 1 | 0 | 1 | 1 | 0 | 1 | 1 | 1 | 1 | 0 | 0 | 1 | 0 | 0 | 0 | 1 | 1 | 0 | 0 | 1 | 0 | 0 |
| 7 | 1 | 1 | 0 | 1 | 0 | 1 | 0 | 0 | 1 | 1 | 1 | 1 | 0 | 0 | 1 | 0 | 1 | 0 | 1 | 1 | 0 | 0 | 0 | 0 |
| 8 | 1 | 1 | 1 | 0 | 1 | 0 | 0 | 0 | 0 | 1 | 0 | 1 | 1 | 0 | 0 | 1 | 1 | 1 | 0 | 1 | 1 | 0 | 0 | 0 |
| 9 | 1 | 1 | 1 | 1 | 1 | 1 | 1 | 0 | 0 | 0 | 1 | 0 | 1 | 1 | 0 | 0 | 0 | 1 | 1 | 0 | 1 | 1 | 0 | 0 |
| 10 | 0 | 1 | 1 | 1 | 0 | 1 | 0 | 1 | 0 | 0 | 1 | 1 | 0 | 1 | 1 | 0 | 1 | 0 | 0 | 1 | 0 | 1 | 0 | 0 |
| 11 | 0 | 0 | 1 | 1 | 1 | 0 | 0 | 0 | 1 | 0 | 0 | 1 | 1 | 0 | 1 | 1 | 1 | 1 | 1 | 0 | 1 | 0 | 0 | 0 |
| 12 | 0 | 0 | 0 | 1 | 1 | 1 | 1 | 0 | 0 | 1 | 1 | 0 | 0 | 1 | 0 | 1 | 0 | 1 | 1 | 1 | 0 | 1 | 0 | 0 |
| 13 | 1 | 0 | 0 | 0 | 0 | 1 | 1 | 1 | 0 | 0 | 1 | 1 | 1 | 0 | 1 | 0 | 1 | 0 | 1 | 1 | 1 | 0 | 0 | 0 |
| 14 | 0 | 1 | 0 | 0 | 1 | 0 | 0 | 1 | 1 | 0 | 0 | 1 | 1 | 1 | 0 | 1 | 1 | 1 | 1 | 1 | 1 | 1 | 0 | 0 |
| 15 | 0 | 0 | 1 | 0 | 1 | 1 | 1 | 0 | 1 | 1 | 1 | 0 | 1 | 1 | 1 | 0 | 0 | 1 | 0 | 1 | 1 | 1 | 0 | 0 |

Table 10*a* represents the locator subwords for single errors. Tables 10*b* to 10*d* represents the locator subwords for double adjacent errors, double non-adjacent errors, and triple adjacent errors, respectively. The locator subword Tables 10*b* to 10*d* are obtained from the locator subwords in Table 9 for single errors by mod. 2 addition of the locator subwords for the bit positions in error. This means that in performing this addition, the carries between successive positions are not utilized. Further, the total subword should be considered to be divided into the locator subword part, consisting of the bits $k_1$ to $k_4$, and the error subword part, consisting of the bits $\pi_1$ and $\pi_2$. Note also that the various bits of the subword are written in ascending order proceeding toward the right hand side of the page, so that the least significant digit is on the left hand side instead of the right hand side. In generating the locator subword for a double adjacent error starting in bit position 1, as shown in Table 10*b*, the subword for a single error in bit position 1 (which is 100101) is added to the locator subword for a single error in bit position 2 (which is 110010). The correct total, when the addition is performed as above indicated, is as shown in Table 10*b*, or 010111. Similarly, the total locator and error subword for a double non-adjacent error starting in bit position 1 is obtained by binary addition of the locator subword for a single error in bit positions 1 and 3 (100101+011011=111110).

It will be seen from the Tables 10*a* to 10*d* that the locator subword part of the total subword is repeated in the various tables. For example the locator subword values 1111 are contained at bit position 9 in Table 10*a*, bit position 5 in Table 10*b*, bit position 1 in Table 10*c*, and bit position 14 in Table 10*d*. In these tables, therefore, the sequences are maintained in order, but the different versions of the single error locator subword Table 10*a* are each shifted a different amount. The error subword parts of the total subword are repeated in both Tables 10*b* and 10*c*, with amounts of shift which are independent of the shift of the four locator bits. The error type indication which is provided for the triple adjacent errors, as evidenced by Table 10*d*, consists in each case of the bits 00 only.

If any one of the four types of related errors occurs in any of the fifteen bit positions of a translated code group, it is therefore possible to determine its location from Table 10. If no error occurs, the six check-sum bits $k_1$ to $\pi_2$ are all 0. If $k_1$ to $\pi_2$ are not all 0's, the particular sequence of 0's and 1's, when compared with Table 10, will indicate both the error type and the bit position where the error begins.

DATA TRANSLATING SYSTEM

Referring now to the drawings, particularly to FIG. 1, an error correcting system in accordance with the invention comprises generally an encoder 11 and a decoder 12 which are interconnected in data translating relationship by some suitable data translating means 13. In practice the input terminal of the encoder 11 is connected to receive signals from a source 14 of binary coded data, while the output terminal of the decoder 12 is connected to supply signals to a device 15 which utilizes the data which has been translated and checked by the system.

The data translating means 13 which interconnects the encoder 11 and the decoder 12 may take several forms depending upon the particular application which is involved. For example, the data translating means 13 may be a commercial telephone link, or it may be a radio transmission link connecting one of a plurality of remote input stations to a centrally located data processing center. In the latter event, for example, the encoder 11 of the error correcting system is located in proximity to a remote input station, and the decoder 12 is associated with the central data processing center. On the other hand, the data source 14 and the utilization device 15 may both be physically located in the same data processing unit, in which event the data translating means 13 which interconnects the encoder 11 and the decoder 12 may, in its simplest form, be a single conductor.

The encoder 11 portion of the error correcting system of FIG. 1 functions generally to transmit a series of code groups each having N bit positions consisting of $H_1$ locator parity bit positions, $H_2$ error type parity bit positions and M data bit positions. The further conditions are observed that $N=2^{H_1}-1$ and the bit positions which are checked by each of the locator parity bits and error type parity bits are determined in accordance with first and second m-sequences respectively. More specifically stated, this last condition is that the binary value of a parity bit is determined by the mod. 2 sum of the binary values of sub-groups of bit positions selected in accordance with the m-sequences.

Figure 2:
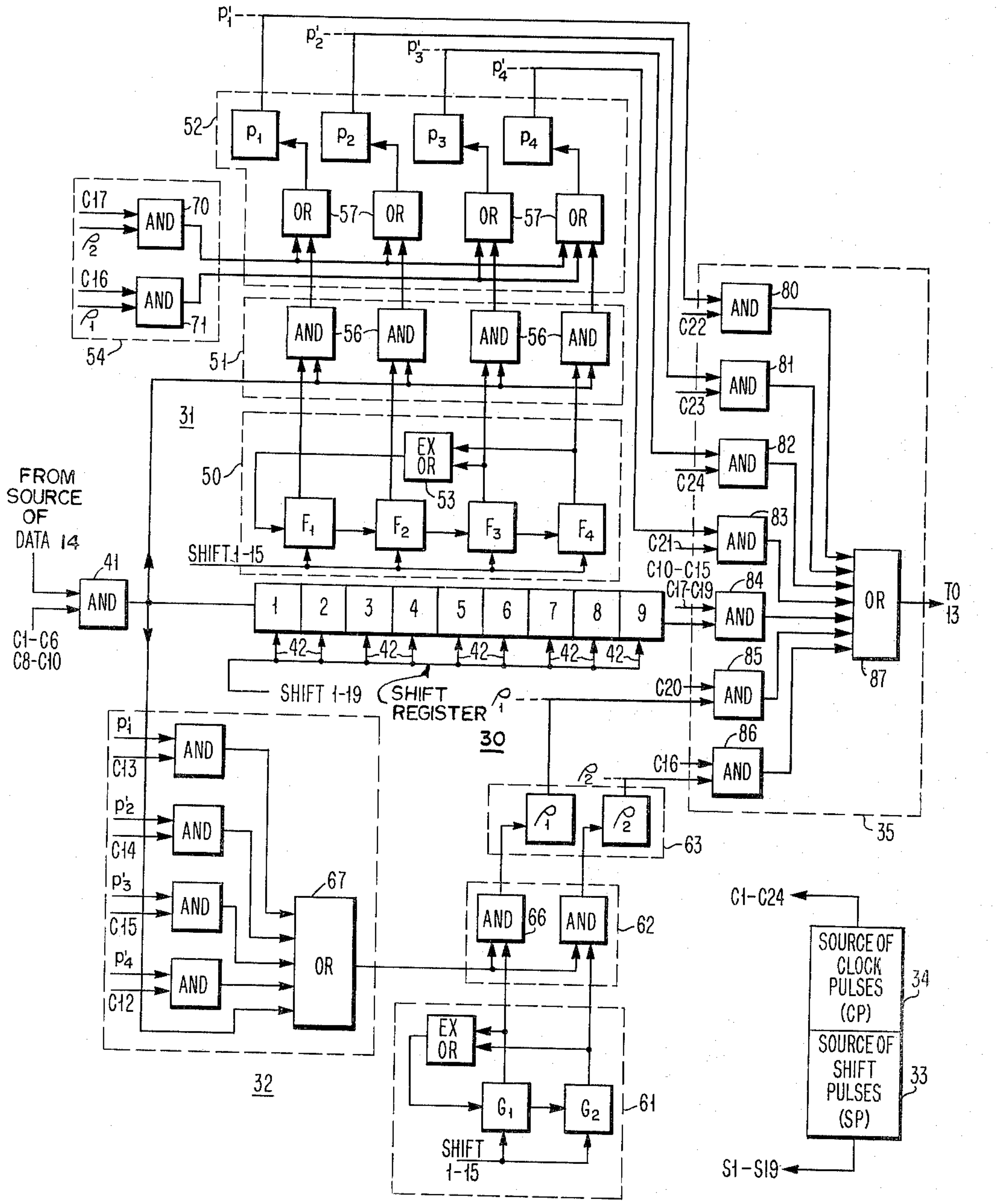
FIG. 2 is a block diagram of a transmitting station suitable for use in the arrangement of FIG. 1.

The encoder 11 of FIG. 1 is shown in detail in FIG. 2. By way of example, the encoder 11 illustrated operates to transmit a code group having fifteen bit positions in all, consisting of four locator parity bit positions, two error type bit positions and nine data bit positions. The encoder is shown as operating in serial fashion, although parallel type operation is also possible. As shown in both FIGS. 1 and 2, the encoder 11 comprises generally a conventional data bit shift register 30, a locator parity bit generator 31, for generating four locator parity bits in accordance with a first m-sequence, an error type parity bit generator 32 for generating two error type parity bits in accordance with a second m-sequence, a source of shift pulses (hereinafter designated by SP in some instances) 33, a source of clock pulses (hereinafter designated in some instances by CP) 34, and a data transmitter 35 for sequentially transmitting the data bits, the locator parity bits and the error type parity bits in a predetermined order. The elements and principal functional units which are thus generally defined are shown in greater detail in FIG. 2. Each of the operative units represented in block diagram form in FIG. 2 represents a circuit of a type well known and widely employed in the digital data processing arts. Accordingly, these circuits have not been shown in detail in order to simplify the presentation.

Referring now specifically to FIG. 2, the shift register 30 as illustrated comprises nine stages 30–1 through 30–9, and is therefore capable of temporarily storing up to nine separate data bits at any one time. The source of data signals 14 is connected to the first stage 30–1 of the shift register 30 through an input AND gate 41 which has its other terminal connected to the source 34 of clock pulses. Each stage 30–1 through 30–9 of the register 30 has a shift input terminal 42 which is connected to the source 33 of shift pulses. The shift pulses and the clock pulses have substantially the same frequency but are displaced in phase by a selected amount to allow entry of a data bit between shift pulses. Any suitable source of clock pulses and any suitable source of shift pulses may be employed. In practice, the shift pulses may be obtained from the clock pulse generator by merely delaying one group of signals relative to the other for a predetermined time.

The nine bits of data which are to be transmitted to the decoder 12 are supplied to the shift register 30 under the control of clock pulses 1 to 6 and 8 to 10. The contents of the shift register 30 are shifted to the right, as viewed in FIG. 2, under the control of shift pulses 1 to 19. No data is supplied to the shift register 30 during CP7 in order to reserve the seventh bit position of the transmitted code group for the $\rho_2$ error type parity bit.

The locator parity bit generator 31 for generating the locator parity bits comprises an m-sequence generator 50, a sampling circuit 51 and a 4-stage storage register 52. The m-sequence generator 50, as shown, is similar to a conventional 4-stage shift register except that a feedback path is established through the "exclusive OR" (designated "EX OR" in FIG. 2) circuit 53 from the output terminal of the third and fourth stages $F_3$ and $F_4$ back to the first stage $F_1$. The output of each stage F of the illustrated m-sequence generator provides the same m-sequences. The m-sequences are shifted, however, relative to each other by one position. The m-sequences may be seen in tabulated form in FIG. 3, where the output of each stage $F_1$ to $F_4$ of the m-sequence generator is presented. It will be noted that each of the columns $F_1$ to $F_4$ define the same 15-digit m-sequence but that the m-sequences in the successive columns are shifted, along the columns, in the manner above described. The particular m-sequence which is illustrated may be defined by the equation $a_t+a_{t+1}=a_{t+4}$.

Output signals from the m-sequence generator 50 are supplied to the sampling circuit 51. The output signals from the generator 50 at the end of any shift pulse may be considered to provide a 4-bit sampling signal which conditions the sampling circuit 51. The sampling circuit 51 comprises four separate AND gates 56. Each AND gate has one terminal connected to the data source through the AND gate 41 at the input terminal of the shift register 30. The other input terminal of each AND gate 56 is connected to the output terminal of a different one of the four stages $F_1$ to $F_4$ of the m-sequence generator 50. When the output signal of a particular stage F is in a "high" condition the associated AND gate 56 is conditioned, allowing a data bit D to be supplied to the storage register 52.

The function of the m-sequence signals from the output terminals of the four stages of the m-sequence generator 50 may be seen by reference to the parity check table of FIG. 4 constructed for the illustrated example. It will be seen that the horizontal rows in FIG. 4 designated $k_1$ to $k_4$ are identical to the vertical columns $F_1$ to $F_4$, respectively, of FIG. 3 if an X is substituted for a 1 and a blank is substituted for a 0. As explained previously in conjunction with the parity check tables, the X indicates that the particular parity bit $p_1$ checks the bit positions marked by the X ($D_1$, $D_2$, $D_4$, $D_6$, $\rho_2$, $D_7$, $D_8$ and itself). The output signal of the $F_1$ stage of the m-sequence generator 50 performs this selective sampling operation. The output signals of the other stages $F_2$ to $F_4$ provide similar selective sampling operations.

The locator parity bit storage register 52, referring again to FIG. 2, comprises four separate 1-stage binary counters. In practice, each stage may represent a conventional trigger circuit or flip-flop which changes back and forth between states in response to an input pulse from the sampling circuit 51. Each of the stages is, in effect, therefore a simple binary counter which keeps count of the number of 1 bits in the bit positions determined by the sampling signal from the m-sequence generator 50.

Because the locator parity bits $p_1$ to $p_4$ check the bit positions assigned to the error type parity bits $\rho_1$ and $\rho_2$, the stages of the locator parity bits $p_1$ to $p_4$ after checking the data bits are designated $p_1'$ to $p_4'$ in the table of FIG. 3 and are modified after the error type parity bits $\rho_1$ and $\rho_2$ are computed. The means 54 for modifying the states of these transitory locator parity bits $p_1'$ to $p_4'$ under control of the final error type parity bits $\rho_1$ and $\rho_2$ is described further on in the specification after the description of the error type parity bit generator 32.

As shown in FIG. 2, the error type parity bit generator 32 for obtaining the error type parity bits $\rho_1$ and $\rho_2$ is similar to the means 31 employed in obtaining the locator parity bits $p_1$ to $p_4$. The error type parity bit generator 32 comprises an m-sequence generator 61, a sampling circuit 62, and an error type parity bit storage register 63. The m-sequence generator 61 has two stages $G_1$ to $G_2$ and operates similarly to generator 50. The m-sequence generator 61 provides the m-sequence tabulated in FIG. 3 in columns $G_1$ to $G_2$. This sequence is only three bits long and then repeats itself.

The sampling circuit 62 is similar to sampling circuit 51 and comprises a pair of AND gates 66. Each AND gate 66 has one input terminal connected to an OR circuit 67 which is supplied with data bits from the input AND gate 41 and with the transitory locator parity bits $p_1'$ to $p_4'$. The other input terminals of the AND gates 66 are connected respectively to the output terminals of the two stages $G_1$ and $G_2$ of the m-sequence generator 61. The AND gates 66 are therefore conditioned by the selective sampling signals from the m-sequence generator 61.

The outputs of the AND gates 66 are connected to the respective stages $\rho_1$ and $\rho_2$ of the error type parity bit storage register 63 which functions in the same manner as the storage register 52. That is, each stage $\rho_1$ and $\rho_2$ of the storage register 63 keeps count of the number of binary 1 bits in the bit position of the code group selected by the m-sequence sampling signals from the m-sequence generator 61.

When the final error type parity bits have been obtained, they are employed to modify the transitory locator parity bits $p_1'$ to $p_4'$. It can be seen from the parity check table in FIG. 4 that the $\rho_2$ bit position is checked by $p_1$, $p_2$, and $p_4$. Therefore, the transitory locator parity bits $p_1'$, $p_2'$ and $p_4'$ are modified by adding 1 to each of the parity bits if $\rho_2$ as finally computed is a 1. The means 54 for modifying $p_1'$, $p_2'$ and $p_4'$ under the control of the value of the $p_2$ parity bit comprises an AND gate 70 having an input terminal which is connected to the output of $\rho_2$ stage of the storage register 63 and another input terminal which is connected to the clock pulse source 34. The output terminal of the AND gate 70 is connected to the respective input terminals of the $p_1$, $p_2$ and $p_4$ stages of the locator parity storage register 52 through the OR circuits 57.

Similarly, it will be seen in the parity check table of FIG. 4 that the $\rho_1$ bit position of the code group is checked by locator parity bits $p_3$ and $p_4$. Therefore, the transitory parity bits $p_3'$ and $p_4'$ are also modified by means 54 by adding 1 to both of these bits if the final value of the $\rho_1$ parity bit is a 1. The means 54 for modifying $p_3'$ and $p_4'$ under the control of the $\rho_1$ parity bit includes AND gate 71 which has one input terminal connected to the $\rho_1$ stage of the storage register 63 and the other input terminal connected to the clock pulse 34. The output terminal of the AND gate 71 is connected to the respective inputs of the $p_3$ and $p_4$ stages of the storage register 52 through the OR circuits 57.

The means 35 for transmitting the data bits $D_1$ to $D_9$, the final locator parity bits $p_1$ to $p_4$ and the error type parity bits $\rho_1$ and $\rho_2$ in a predetermined order comprise, as shown in FIG. 2, a series of seven AND gates 80 to 86 and a seven terminal OR gate 87. The AND gate 84 has one input terminal connected to the output terminal of the last stage 30–9 of the shift register 30, while its other input terminal is connected to the clock pulse source 34 and receives clock pulses 10 to 15 and 17 to 19. Each of the AND gates 80 to 83 has one terminal connected to the respective output terminals of the locator parity bit storage register 52, while each of the AND gates 85 and 86 has one input terminal connected to the respective output terminals of the error type parity bit storage register 63. The other terminals of the AND gates 80 to 83 and AND gates 85 to 86 are connected to the source 34 of the clock pulses and each receives a particular clock pulse. The particular clock pulses which are supplied to each of the seven AND gates 80 to 86 are designated in FIG. 2 on the respective input lines.

Before proceeding with a detailed description of the decoder 12, an example of the encoding operation will be given.

The operation of the encoder 11 shown in FIG. 2 may be better understood by concurrent reference to the tabulation of FIG. 3. It will be assumed that a word consisting of nine data bit positions $D_1$ to $D_9$ is to be encoded and transmitted to the decoder 12 of FIG. 1 along with four locator parity bits and two error type parity bits. The word to be encoded by way of example is shown in FIG. 3 along with the state of the m-sequence generators and the parity bit registers at the start of the encoding operation. As shown, the condition of the four stages $F_1$ to $F_4$ of the first m-sequence generator 50 prior to starting is 0010, respectively, while the condition of the two stages $G_1$ and $G_2$ of the second m-sequence generator 61 prior to starting is 11 respectively. The parity bit storage registers 52 and 63 and the shift register 30 are set to all 0's. Clock pulses C1 to C6 and C8 to C10 are supplied to the input AND gate 41 while the m-sequence generators 50 and 61 are supplied with shift pulses S1 to S15. Shift register 30 is supplied with shift pulses S1 to S19.

The condition of the first m-sequence generator 50 at the end of the first shift pulse, as shown in FIG. 3 on the line containing the first shift pulse, is 1001. As a result the first and fourth AND gates 56 of the sampling unit 51 are conditioned, which allows the first data bit $D_1$ to be supplied to the $p_1$ and $p_4$ stages of the storage register 52 during the first clock pulse time C1.

THE DECODER OF THE DATA TRANSLATING SYSTEM

The decoder 12 for the error correcting system, as shown diagrammatically in FIG. 1, includes a data receiver 100 which derives information signals from the translating means 13. The transmitted code group is applied from the data receiver 100 to a shift register 101 containing the proper number of places for receiving the transmitted data and parity bits. In order to determine whether an error has occurred, the transmitted code group is also applied to a first parity check means 102 and a second parity check means 103, these being checking circuits for the locator parity bit and the error type parity bit, respectively. Indications of errors from the first and second parity check means 102, 103 are utilized to control an error determining means 104. Indications of an error actuate an error sequence control means 107 which is intercoupled with an error correcting means 106 so as to initiate and follow an error correcting sequence. The error sequence control means 107 is also connected to a gating means 108 coupled to the output terminal of the shift register 101, which controls the flow of data to a corrected data transfer means 109, or returns the data to the input terminal of the shift register 101. The corrected data transfer means 109 controls the passage of the corrected data bits to an associated utilizatiton device 15. In this arrangement, the error correcting means 106 is also coupled to receive signals from the first parity check means 102 and the second parity check means 103, and is coupled to control selected stages of the shift register 101.

Figure 5:
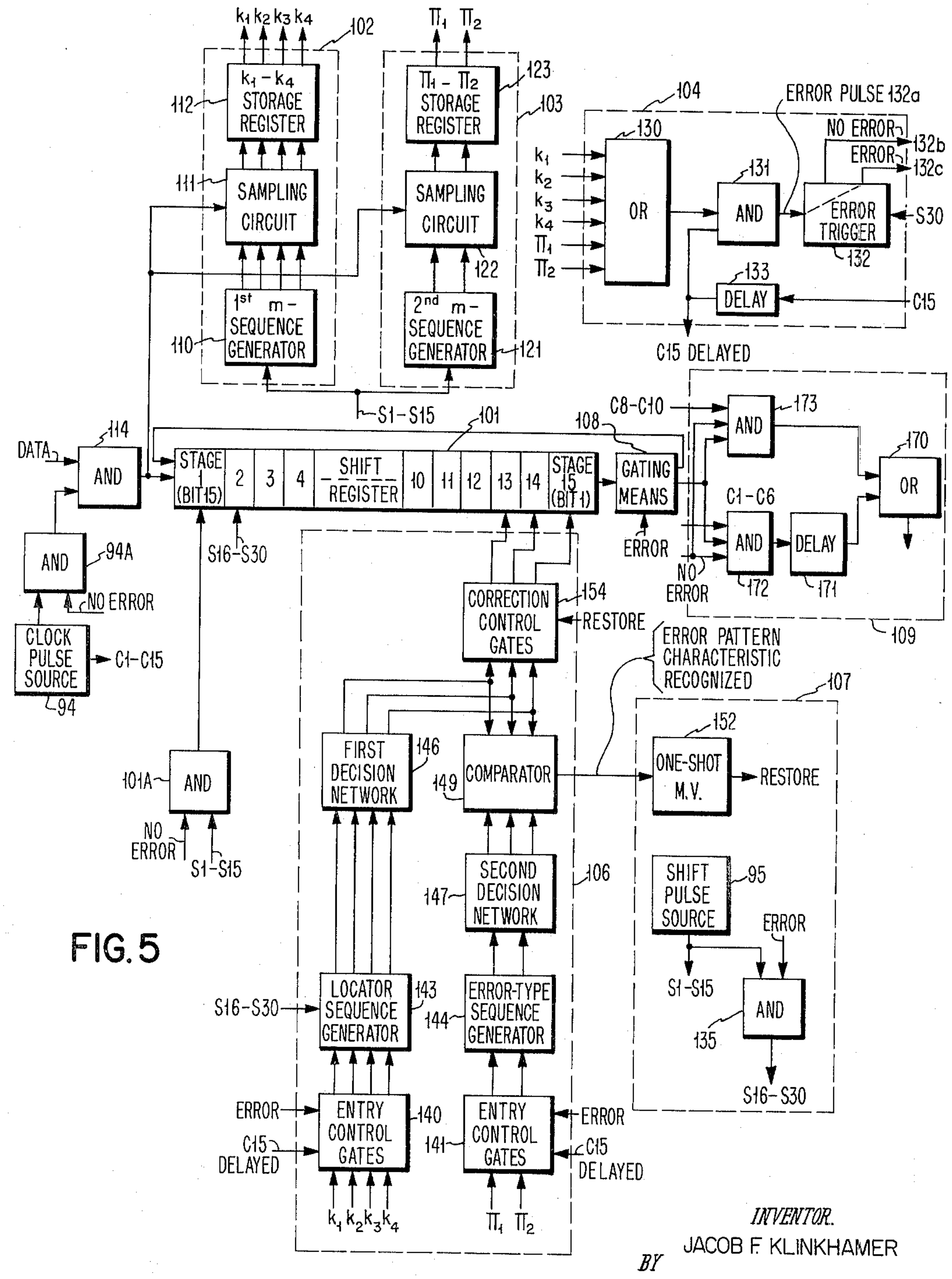
FIG. 5 is a block diagram representation of a receiving station including an error correcting means which may be employed in the arrangement of FIG. 1.

FIG. 5 illustrates with greater particularity an example of the decoder sohwn in block form in FIG. 1. A check pulse source 94 and a shift pulse source 95 correspond generally to the like designated elements in FIG. 2. The first parity check means 102, for making a reception parity check of four bit positions determined by a first m-sequence, comprises a first m-sequence generator 110, a sampling circuit 111, and a 4-stage storage register 112. The second parity check means 103 makes a reception parity check over bit positions determined by the second m-sequence. As shown in FIG. 5, the second parity check means 103 comprises a second m-sequence generator 121, a sampling circuit 122 and a 2-stage storage register 123. The sampling circuits 111 and 122 are identical to the sampling circuits 51 and 62 respectively of the encoder 11, and are supplied with the received signals through a decoder input AND gate 114, which is conditioned during clock pulse times C1 to C15 provided the previous word has been received correctly. The decoder input AND gate 114 may, in practice, comprise the output of a data receiver.

Each stage of the storage registers 112 and 123 therefore counts the number of binary 1's in the bit positions determined by the respective m-sequences. The storage registers 112 and 123 will contain all the 0's if the 15-bit code group is received correctly. If an error has occurred, at least one of the stages $k_1$ to $k_4$ or $\pi_1$ to $\pi_2$ will contain a 1. The output of the decoder input AND gate 114 is also connected to the shift register 101, which is supplied with shift pulses S1 to S15 through an AND gate 101A which controls the shifting of the received code group into the register 101 from left to right (as viewed in FIG. 5). The other terminal of the AND gate 101A is supplied with a no error signal which conditions the AND gate 101A.

The error determining means 104 for providing an error signal if an error has occurred comprises in this instance a 6-terminal OR circuit 130, and AND gate 131, an error trigger 132 and a delay circuit 133. The respective output terminals of the different stages $k_1$ to $k_4$ of the locator parity bit storage register 112 and the stages $\pi_1$ and $\pi_2$ of the error type storage register 123 are coupled to the various inputs of the OR circuit 130. The output terminal of the OR circuit 130 is connected to one input terminal of the AND gate 131, which is conditioned by a delayed clock pulse C15 supplied through the other input terminal through the delay circuit 133. The output terminal of the AND gate 131 is connected to one input terminal 132$a$ of the error trigger 132. The error trigger circuit 132 has one output terminal 132$b$ which is normally high, thus indicating no error, and a second output terminal 132$c$, which is normally low. An error pulse applied to the input terminal 132*a* from the OR circuit 130 causes the output terminal 132*b* to change from a high to a low state, and the output terminal 132*c* to change from a low to a high state, thus indicating the presence of the error. The error trigger circuit 132 is reset by an S30 pulse after the error correction sequence has been undertaken.

Shift pulses S1 to S15 are generated as in the arrangement described in conjunction with encoding. Shift pulses S16 to S30 are generated in the presence of the error signal by application of pulses from the shift pulse source 95 together with the error signal to an AND gate 135. The S16 to S30 shift pulses are derived at the output terminal of the AND gate 135.

The shift register 101 is caused to recirculate data bits during the error cycle of operation. Recirculation is accomplished by means of the gating means 108 which may, for example, be equivalent of a single pole, double throw switch. In the presence of an error signal, the gating means 108 recirculates signals derived at the last stage of the shift register 101 back to the input terminal and the first stage of the shift register 101. Stepping of the shift register is controlled by the S1 to S15 pulses in a no error mode of operation, as controlled by AND gate 101A. During the error correcting mode of operation, the S16 to S30 pulses are provided to shift the data bits along the shift register 101.

In the error correcting means 106, the various check-sum bits $k_1$ to $k_4$ and $\pi_1$ and $\pi_2$ are provided concurrently to separate entry control gates 140 and 141 respectively. The entry control gates 140, 141 are conditioned to accept the various check-sum bit signals by the concurrent presence of the C15 delayed pulse and the error signal. The C15 delayed pulse is derived from the delay circuit 133 of the error determining means 104, which is actuated by the C15 clock pulse. It is assumed that the C15 delayed pulse is of sufficient duration to coincide for a time with the error signal derived from the error trigger 132. If not, a further delay circuit may be coupled to the delay circuit 133 in the error determining means 104 to assure the concurrent time relationship.

The signals passed by the entry control gates 140, 141 are thus entered into a locator sequence generator 143 and an error type sequence generator 144, respectively. Although the locator sequence generator 143 and error type sequence generator 144 are shown separately herein for ease of reference and explanation, it will be appreciated that this function may in fact be filled in more economical fashion by the storage registers 112, 123, As is described in more detail below, intercoupled adder circuits properly connecting the various stages of the storage registers may enable these registers to step forwardly or reversely through an m-sequence. Here, the locator sequence generator 143 and the error type sequence generator 144 are stepped reversely through their m-sequences in separate increments under control of the S16 to S30 shift phases. This stepping is needed only during a particular part of the error correcting mode of operation, and is controlled by "reverse" signals generated in a manner described in more detail below.

The signals derived at the output terminals of the locator sequence generator 143 control a first decision network 146, which in turn provides a unique and predetermined coded value for each different set of input signals. A considerable variety of elements, well known in the art, are available to perform the functions of the first decision network 146, and any of such elements may be employed for this purpose, including diode matrices, logical gating networks, and decoder circuits. Selected values, corresponding to certain error correction patterns, are generated by the first decision network 146 for each state of the locator sequence generator 143. Selected values, also coresponding to error correction patterns, are also generated by a second decision network 146 coupled to the error type sequence generator 144. These coded values from each of the decision networks 146, 147 are tested for equality in a comparator 149.

Upon a determination of equality, the comparator 149 provides a signal which indicates that the characteristic of the error pattern has been recognized, and this signal actuates a one-shot multivibrator 152 in the error sequence control means 107. The output pulse from the one-shot multivibrator 152 is here called a "restore" signal and is used to terminate a phase of the error correcting mode of operation.

The output signals derived from the first decision network 146 are also applied to correction control circuits 154 which are coupled to selected stages of the shift register 101. Although any consecutive group of stages of the shift register 101 may be employed, by proper observance of certain relationships, the correction control circuits 154 are here coupled to the last three stages by way of illustration. The corection control circuits 154 perform the function of reversing the binary states of the stages containing bits of data injured by an error burst. This may also be considered to be a mod. 2 addition to the binary values contained in these stages.

The corrected data transfer means 109 of FIG. 1 include an OR circuit 170, a delay circuit 171 and a pair of AND gates 172 and 173. Each of the AND gates 172, 173 is conditioned by the no error signal. A first AND gate 172 is primed for operation by clock pulses C1 to C6, and the other AND gate 173 is primed by clock pulses C8 to C10. The remaining input terminals of the AND gates 172, 173 receive data signals from the gating means 108. When no error exists, either because the check sums indicate that the data has been translated correctly or because the error has been corrected, the data bits are applied to the AND gates 172, 173. Because of the presence of the $\rho_2$ error type parity bit in the transmitted data, and because the parity bits are not to be transferred to the utilization device 15, the nine data bits of the transmitted code group would not be transferred in a continuous sequence to the utilization device 15 without the operation of the corrected data transfer means 109. The first six data bits, provided concurrently with C1 to C6, are thus passed through the AND gate 172 to a 1-bit time delay circuit 171, and shifted in time to one clock pulse interval later from the time at which they are derived. The signals from both AND gates 172, 173 are passed through the OR circuit 170 to the utilization device 15. Because of the delay, however, the data bit occurring in the sixth postiion, along with C6, is effectively shifted to the seventh bit position, as the first five data bits are correspondingly shifted, so that a continuous sequence of data bits results, with the parity bits being excluded from this information.

In the operation of the decoder 12 of FIG. 5 when a 15-bit code group is transmitted correctly and received correctly from the encoder 11, the code group is shifted out as the bits of the next code group are shifted into the register 101. To carry out the error correcting mode, the code groups are not transmitted continuously, but during alternate intervals corresponding to the intervals S1–S15, and S16–S30.

Assuming that the previous code group was received without error, so that the error correcting mode was not initiated, the source of clock pulses 94 supplies clock pulses C1 to C15 to the decoder input AND gate 114, which gates each bit of the new code group to the first stage of the shift register 101, the sampling circuit 111 and the sampling circuit 122. Shift pulses S1 to S15 from the source of shift pulses 95 are supplied to the shift register 101 through the AND gate 101A, so that the received code group is shifted into the register 101 from left to right, as viewed in FIG. 5. The shift pulses S1 to S15 are also supplied to the first and second m-sequence generators 110 and 121 respectively. As each bit of the code group is received, it is supplied to the sampling circuits 111 and 122 which have been conditioned by the signals derived on the output terminals of the m-sequence generators 110 and 121 respectively. These output signals sequentially operate the sampling circuits 111 and 122 so that reception parity checks are made over the bit positions of the received code group determined by the m-sequences employed in the encoder 11. Hence, if the 15-bit code group is received correctly, each of the check-sum bits $k_1$ to $k_4$, $\pi_1$ and $\pi_2$ will be 0. The output signal from the OR circuit 130 in the error determining means 104 is therefore low, which prevents the delayed C15 pulse from turning the error trigger 132 on, so as to provide the error signal, by passage through the AND gate 131. Because the no error signal from the output terminal 132*b* is high, the next group of clock pulses C1 to C15 and the shift pulses S1 to S15 cause the 15-bit code group to be shifted out of the register 101 to the utilization device 15 of FIG. 1. The parity bits $p_1$ to $p_4$, $\rho_1$ and $\rho_2$ which are contained in the code group in the shift register 101 are prevented from reaching the utilization device because the AND gates 172 and 173 are closed during the corresponding times in the readout cycle. As the 15-bit code group is shifted out of the register 101, the next 15-bit code group is shifted into the register from the input AND gate 114.

SYSTEM OPERATION IN DETECTING AND CORRECTING AN ERROR

The presence of an error in a received data group results in the detection of the error and the initiation of a different sequence of operations, terminating with correction of the error. Errors of the type which can be corrected, as indicated above, comprise the great majority of errors likely to occur in a practical case. The detailed operation will be explained with reference to FIG. 5.

Signals derived at the data receiver 100 from the data translating means 13 are entered into the shift register 101, as before. During this operation, however, the check sums $k_1$ to $k_4$ and $\pi_1$ to $\pi_2$ which are built up are not all 0's. Instead, the contents of $k_1$ to $k_4$ and $\pi_1$ to $\pi_2$ storage registers 112, 123 respectively contain, at the end of entry of the data group, "1" bits which together indicate the location and the type of the error. As each bit of the data group is provided to the sampling circuits 111, 122, parity checks are made as determined by the selected m-sequences. In the first parity check means 102, for example, the reception parity checks are made successively at S1 to S15 in accordance with the selected m-sequence established by the first m-sequence generator 110. At the time of full entry of the data, or S15, the "1" bits in the check sums $k_1$ to $k_4$ and $\pi_1$ to $\pi_2$ condition the AND gate 131 in the error determining means 104 through the OR gate 130. The delayed C15 pulse is then caused to fully activate the AND gate 131, so as to apply an error pulse which sets the error trigger 132 into the state in which the terminal 132*c* is high, indicating an error.

The error pulse from the AND gate 131 thus initiates an error correcting mode, which is carried out and completed during the S15–S30 interval. For operation in this mode, the error pulse causes entry of the check sums $k_1$–$k_4$ and $\pi_1$–$\pi_2$ into the locator sequence generator 143 and the error type sequence generator 144 respectively through the entry control gates 140, 141 respectively.

At the start of the error correcting mode the contents of the locator sequence generator 143 and error type sequence generator 144 are determined by the m-sequences which are used. For convenience, the locator subwords for the different error types, shown originally in Table 10, are repeated here:

*Table 10*

| Error starting in bit | 10a 1 | | | | | | 10b 11 | | | | | | 10c 101 | | | | | | 10d 111 | | | | | |
|---|---|---|---|---|---|---|---|---|---|---|---|---|---|---|---|---|---|---|---|---|---|---|---|---|
| | $k_1$ | $k_2$ | $k_3$ | $k_4$ | $\pi_1$ | $\pi_2$ | $k_1$ | $k_2$ | $k_3$ | $k_4$ | $\pi_1$ | $\pi_2$ | $k_1$ | $k_2$ | $k_3$ | $k_4$ | $\pi_1$ | $\pi_2$ | $k$ | $k$ | $k$ | $k$ | $\pi_1$ | $\pi_2$ |
| 1 | 1 | 0 | 0 | 1 | 0 | 1 | 0 | 1 | 0 | 1 | 1 | 1 | 1 | 1 | 1 | 1 | 1 | 0 | 0 | 0 | 1 | 1 | 0 | 0 |
| 2 | 1 | 1 | 0 | 0 | 1 | 0 | 1 | 0 | 1 | 0 | 0 | 1 | 0 | 1 | 1 | 1 | 1 | 1 | 0 | 0 | 0 | 1 | 0 | 0 |
| 3 | 0 | 1 | 1 | 0 | 1 | 1 | 1 | 1 | 0 | 1 | 1 | 0 | 0 | 0 | 1 | 1 | 0 | 1 | 1 | 0 | 0 | 0 | 0 | 0 |
| 4 | 1 | 0 | 1 | 1 | 0 | 1 | 1 | 1 | 1 | 0 | 1 | 1 | 0 | 0 | 0 | 1 | 1 | 0 | 0 | 1 | 0 | 0 | 0 | 0 |
| 5 | 0 | 1 | 0 | 1 | 1 | 0 | 1 | 1 | 1 | 1 | 0 | 1 | 1 | 0 | 0 | 0 | 1 | 1 | 0 | 0 | 1 | 0 | 0 | 0 |
| 6 | 1 | 0 | 1 | 0 | 1 | 1 | 0 | 1 | 1 | 1 | 1 | 0 | 0 | 1 | 0 | 0 | 0 | 1 | 1 | 0 | 0 | 1 | 0 | 0 |
| 7 | 1 | 1 | 0 | 1 | 0 | 1 | 0 | 0 | 1 | 1 | 1 | 1 | 0 | 0 | 1 | 0 | 1 | 0 | 1 | 1 | 0 | 0 | 0 | 0 |
| 8 | 1 | 1 | 1 | 0 | 1 | 0 | 0 | 0 | 0 | 1 | 0 | 1 | 1 | 0 | 0 | 1 | 1 | 1 | 0 | 1 | 1 | 0 | 0 | 0 |
| 9 | 1 | 1 | 1 | 1 | 1 | 1 | 1 | 0 | 0 | 0 | 1 | 0 | 1 | 1 | 0 | 0 | 0 | 1 | 1 | 0 | 1 | 1 | 0 | 0 |
| 10 | 0 | 1 | 1 | 1 | 0 | 1 | 0 | 1 | 0 | 0 | 1 | 1 | 0 | 1 | 1 | 0 | 1 | 0 | 0 | 1 | 0 | 1 | 0 | 0 |
| 11 | 0 | 0 | 1 | 1 | 1 | 0 | 0 | 0 | 1 | 0 | 0 | 1 | 1 | 0 | 1 | 1 | 1 | 1 | 1 | 0 | 1 | 0 | 0 | 0 |
| 12 | 0 | 0 | 0 | 1 | 1 | 1 | 1 | 0 | 0 | 1 | 1 | 0 | 0 | 1 | 0 | 1 | 0 | 1 | 1 | 1 | 0 | 1 | 0 | 0 |
| 13 | 1 | 0 | 0 | 0 | 0 | 1 | 1 | 1 | 0 | 0 | 1 | 1 | 1 | 0 | 1 | 0 | 1 | 0 | 1 | 1 | 1 | 0 | 0 | 9 |
| 14 | 0 | 1 | 0 | 0 | 1 | 0 | 0 | 1 | 1 | 0 | 0 | 1 | 1 | 1 | 0 | 1 | 1 | 1 | 1 | 1 | 1 | 1 | 0 | 0 |
| 15 | 0 | 0 | 1 | 0 | 1 | 1 | 1 | 0 | 1 | 1 | 1 | 0 | 1 | 1 | 1 | 0 | 0 | 1 | 0 | 1 | 1 | 1 | 0 | 0 |

In error correction according to the present invention, particularly effective use is made of the properties of m-sequences to the effect that different locator and error type subwords result from errors of different kinds which start in different bits. Detailed mechanisms are fully described below. At the outset, however, the system operation in the error correcting mode will more readily be visualized by a generalized review of the major steps involved.

Note that for an error starting in bit position 1 (and for any other bit position as well) *both* the locator subwords and the error type subwords differ with the kind of error. The present invention makes use of this fact, by effectively shifting the m-sequences of the locator subwords and error type subwords to a selected standard position. At the same time, the data is also shifted, and very simply corrected.

Bearing Table 10 in mind, relative to FIG. 5, the sequence generators 143, 144 then cycle reversely, one step at a time, in response to the individual shift pulses beginning with S16. The "error" signal is also present at this time, and conditions the gating means 108 to cause recirculation, in a forward direction, of data in the shift register 101. This is also accomplished, one step at a time, beginning with S16. By inspection of Table 10, it will be seen than any of the locator and error type subword combinations are ultimately transformed, by the steps of the m-sequence, into one of a number (here four) of unique subword combinations. Here, the subword combinations at bit position 1 are used for recognition of error pattern characteristics. Thus an error burst starting at bit position 9 results in certain subwords (depending upon the error type), and these are transformed 8 shift pulses later, into the subwords for errors starting at bit position 1.

Concurrently with the reverse m-sequence shifts, the data in the shift register 101 is moved forward. Now it must be recognized that when the register 101 is filled the 15th stage is occupied by the data from bit position 1, and the 1st stage by the data from bit position 15. Accordingly, after 8 shifts the error burst starting at bit position 9 is in position at the 15th stage of the shift register 101, and thus in an equivalent position to the initial location of bit position 1. The selected bit position may therefore be termed a standard subword location, and may be at any of the possible points in the data group.

The location and type of the error burst are both partially identified by the locator subwords at the standard subword location. Because the locator subwords are repeated, with various shifts, in the sequences (depending upon error type), there would, without more, be ambiguity as to the length and nature of the error burst. The error type subwords which also exist at the standard subword location, however, make full subword combinations which are unique. The locator subword 0101 and error type subword 11 occur in combination only with the equivalent of double adjacent error bursts starting in bit position 1. Only the m-sequences tabulated in 10*b* give these combinations when the proper position is reached. On identification of these combinations the system signifies that a double adjacent error burst occurred, and that the injured data has been shifted to a position in which it may be corrected.

Inspection of Table 10 will verify that (with the selected standard subword location of bit position 1) the m-sequence shifts will ultimately provide other unique subword combinations of 1001 01 (for single errors), 1111 10 (for double non-adjacent errors) and 0011 00 (for triple adjacent errors). These unique subword combinations are recognized and used for error correction in particularly simple fashion in systems in accordance with the present invention. The first decision network 146 is arranged to provide an error correcting pattern suitable for each of the unique locator subword combinations. Thus, the first decision network 146 provides a pattern of 001 for 1001 (single error), 011 for 0101 (double adjacent), 101 for 1111 (double non-adjacent), and 111 for 0011 (triple adjacent). The second decision network 147 is then arranged to provide a like succession of patterns for 01, 11, 10 and 00, respectively. When the two parts of the subword combination are alike, the comparator 149 provides a suitable signal, actuating the one-shot multivibrator 152 to generate the "restore" signal.

The output signal codes from the first decision network 146 are those needed to correct the error bursts in the injured data. For instance, a triple adjacent error in the data is corrected merely by reversing the states of the adjacent stages in the shift register 101 by application of "1" valued signals to each. Only the proper correction signals are applied, because the transitory "restore" signal is provided only during the proper shift time.

After the restoration of the data to its corrected form, the data is then recirculated into its original position by the remaining shift pulses S16–S30 during the error correction mode. Subsequent changes in the sequence generators 143, 144 during this interval are made, but are immaterial. The corrected data is then in position to be shifted out during entry of the succeeding data group. Error correction cycles are terminated by application of the S30 signals to the error trigger 132.

Although a specialized case (i.e. 4 locator bits and 2 error type bits in specified m-sequences) has been given in order to describe the invention, the same principles are susceptible of use in a large number of ways and with a broad variety of elements, as long as certain relationships are observed. One required relationship is that the amount of relative shift between the locator m-sequences be different for each error type. As seen in Table 10, this relationship holds for the m-sequences chosen by way of example. The second required relationship is that there should also be unique differences, for each error type, between the relative shift of the locator m-sequences and the relative shift of the error type m-sequences. If these relationships are observed the data group and error correcting codes may be widely varied in accordance with particular needs.

For more ready visualization of the general case, it is convenient to refer to the locator sequence generator 143 as (LSG) and the error type sequence generator 144 as (ETSG). The $k_1$–$k_4$ and $\pi_1$–$\pi_2$ storage registers 112, 123 may be called storage registers (LPR) and (TPR), whole final states may then be represented as $(LPR)_F$ and $(TPR)_F$. The relative shifts in the m-sequences which result from different error patterns may be referred to as pattern shifts $S_L$ and $S_T$ for locator and error type sequences respectively. The properties of m-sequences are such that more than one error in positions $n$, $n+a$, $n+a_2$ etc. in a data group produces the same $(LPR)_F$ as *one* error in position $n+S_L$, and the same $(TPR)_F$ as one error in position $n+S_T$. The position $n$ of the first error of the pattern may be denoted the "location of the pattern," and the following may be stated:

$$(LPR)_F=(LSG)_{n+S_L}$$
$$(TPR)_F=(ETSG)_{n+S_T}$$

where $(LSG)_n$ and $(ETSG)_n$ mean the content of the sequence generators 143, 144 at position $n$.

The above requirements mean, in other words, that all error patterns to be considered should have both different $S_L$ and $S_T-S_L$. The latter requirement means, more specifically, that the remainder of $S_T-S_L$ modulo $2^{R_T}-1$ ($R_T$ being the number of stages in the error type registers) should be different for all error patterns.

Figure 6:
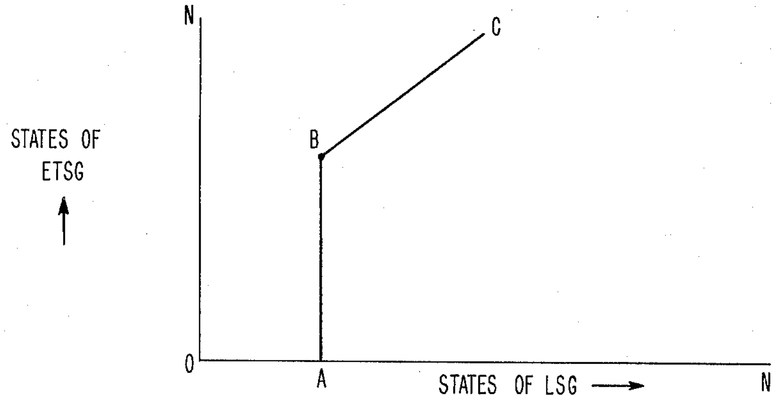
FIG. 6 is a diagram representing the changes in state of certain elements used in the operation of the arrangement of FIG. 5.

The manner in which these relationships are utilized is represented in the diagram of FIG. 6. Here, the states of LSG are indicated by the abscissae and those of ETSG by the ordinates. The point C represents an $(LPR)_F$; $(TPR)_F$ corresponding to a certain error pattern. As the $S_L$ and $S_T$ which correspond to that error pattern can be defined, the distances $OA=S_L$ and $AB=S_T$. The vertical and horizontal distances from B to C are each $= n$. The point B represents the states of $(LPR)_F$ and $(TPR)_F$ when the same error pattern occurs at the first position (here bit location 1). Point B is therefore characteristic of the error pattern and independent of the location where it occurs.

In the general case, if the only error bursts which can be expected are equal in length or shorter than one plus the number of stages (flip-flops) in the shortest of the two sequence generators, there are specific $S_L$ and $S_T$ values corresponding to each error pattern. The points B which belong to two arbitrary error patterns (of the types which can be corrected) always are at different horizontal as well as vertical locations. The diagram of FIG. 6 also represents the case in which the ETSG and LSG states are equal, whereas in the sequences of Table 10 the ETSG states are repetitive, although the same reasoning applies.

The unique positions of the points B on the diagram are representative of the different error patterns, and in a particularly useful way. If we proceed along the BC diagonal from point C we go through $n$ steps, corresponding to the location of the error pattern. By shifting the data concurrently with the m-sequence shifts, the data is placed in the selected standard location at which it can be corrected. The problem is therefore to recognize arrival at point B, and this is resolved by the error correcting means 106 of FIG. 5. These means 106 make use of the fact that the remainder of $S_L$ modulo $2^{R_L}-1$ is a unique function of the error pattern, for error patterns of length $R_L+1$. There is thus a one-to-one relationship between error patterns of maximum length $R_L$ and points A in FIG. 6. As the shifts proceed through the different points A, different error patterns are indicated for the various points B. Only when the state of ETSG concurrently denotes a like error pattern, however, is there indication of the location of an error. Various alternative means for performing these functions are described below.

Figure 7:
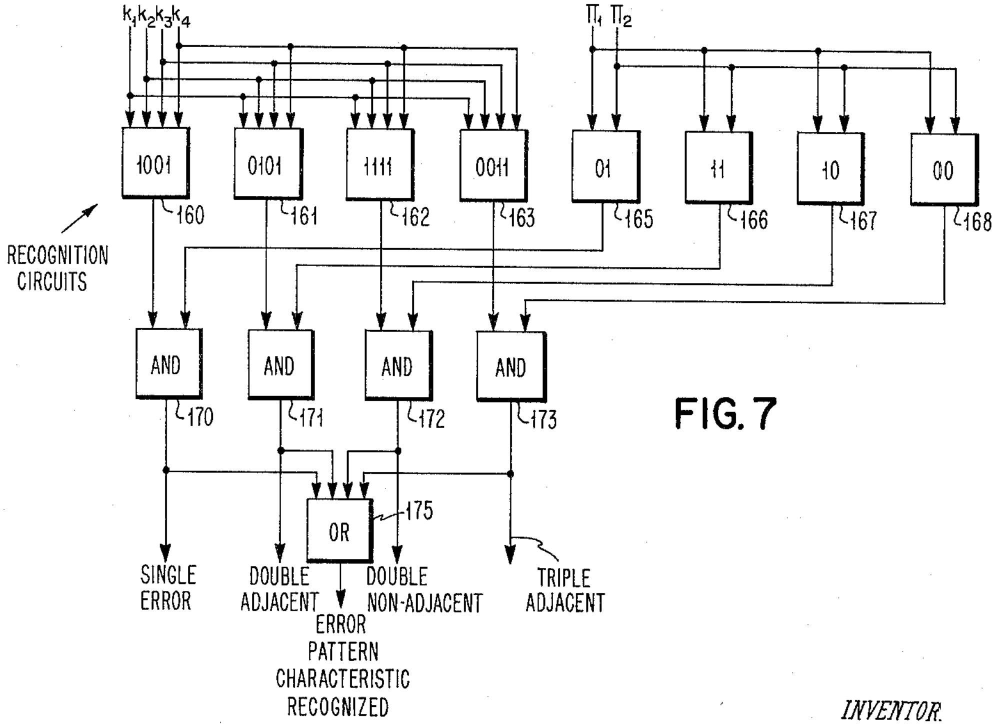
FIG. 7 is a block diagram of a circuit which may be used in an error correcting means in systems in accordance with the invention.

In many instances, the decision networks 146, 147 of FIG. 5 may consist of simple and inexpensive decoding matrices. It is sometimes convenient, however, to use other forms of logical gating networks. One such circuit is shown in FIG. 7, and is intended for use with the coding described in Table 10. The locator subword signals $k_1$–$k_4$ are applied to a first group of recognition circuits 160–163, each of which provides an output signal only when a chosen signal pattern is present. Such recognition circuits are widely known and need not be described in detail. Concurrently, the error type subword signals $\pi_1$ and $\pi_2$ are applied to another group of recognition circuits 165–168. Associated AND gates 170–173, coupled to pairs (e.g. AND gate 170 is coupled to recognition circuits 160 and 165) of the recognition circuits, provide a signal through an OR gate 175 only when both recognition circuits are activated.

This circuit therefore continually tests the signal patterns derived during shifting of the locator sequence generator 143 and the error type sequence generator 144 when the system is operating in the error correcting mode. There is coincidence of two signal patterns only once, at the proper increment of the S16–S30 interval. The coincidence detection also separately indicates the type of error, so that a separate gating circuit may enter the proper correction into the shift register 101.

Figure 8:
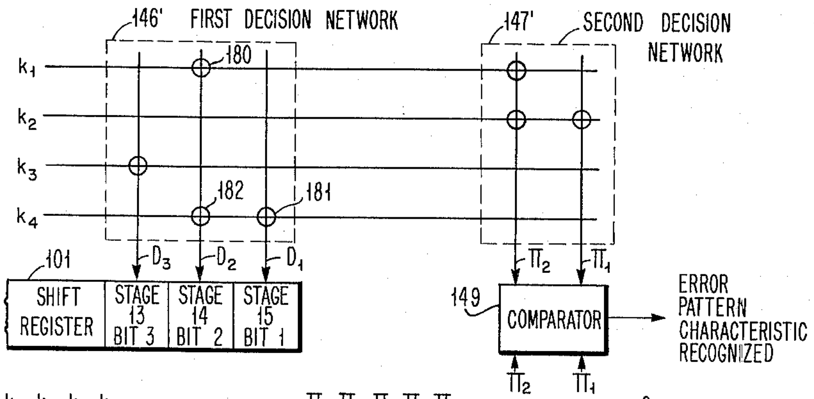
FIG. 8 is a simplified block diagram of another form of circuit which may be used in an error correcting means in systems in accordance with the invention.

In a preferred arrangement, the advantages of m-sequences are affectively used by a particularly simple set of decision networks as shown in the system of FIG. 8. This system is set to use the m-sequences of Table 10, and to correct three-bit-wide error bursts. The locator sequence generator 143 of FIG. 5 is coupled to provide signals to both a first decision network 146′ and a second decision network 147′. The first network 146′ contains a group of gates which serve an "exclusive OR" function, each gate being designated by a circle encompassing an intersection of two lines. An input signal on line $k_1$, for example, provides an output signal on the $D_2$ line through the gate 180, whereas an input signal on both lines $k_1$ and $k_4$ results in an output signal only on line $D_1$ through the gate 181. Signals applied to the gates 180 and 182 on the $D_2$ line are mutually inhibited and no output signal is derived. In effect, mod. 2 sums are provided.

The second decision network 147′ is likewise coupled to provide coded output signals in response to $k_1$–$k_4$. Inspection of both of these networks 146′ and 147′ relative to Table 10 will reveal that the same function is performed as in the FIG. 7 circuit. That is, the first decision network 146′ provides an error correction pattern to the shift register 101, while a test is made of the relationship between the two subwords in the combination. To make the test, however, the $k_1$–$k_4$ combination is converted to a $\pi_1$–$\pi_2$ equivalent in the second decision network 147′, and this equivalent is compared in the comparator 149 to the actual $\pi_1$ and $\pi_2$ signals then provided from the error type sequence generator 144 of FIG. 5. The economy of this circuit is derived from advantageous use of the properties of the m-sequences in arranging the matrices which perform the conversions.

Those skilled in the art will recognize that the principles of the invention may be extended to much more complicated codes. As one example, it may be desired to use 31 bit messages in which there are 20 information bits, 5 locator parity bits, 5 error type parity bits and 1 overall parity check bit. Using the characteristic equation $x^5+x^3+1=0$ for the locator m-sequence, and the characteristic equation $x^5+x^3+x^2+x+1=0$ for the error type m-sequence, the following sequences are obtained:

| | 1 | 6 | 11 | 16 | 21 | 26 | 31 |
|---|---|---|---|---|---|---|---|
| Locator sequence | 00001 | 01011 | 10110 | 00111 | 11001 | 10100 | 1 |
| Error type sequence | 00001 | 01101 | 01000 | 11101 | 11110 | 01001 | 1 |

The shifts and the parity for each error pattern are given here as Table 11:

*Table 11*

| Error pattern | Shifts (Remainders modulo 31) | | | Overall check bit |
|---|---|---|---|---|
| | $S_L$ | $S_T$ | $S_T-S_L$ | |
| 10000 | 0 | 0 | 0 | 1 |
| 10001 | 25 | 17 | 23 | 0 |
| 10010 | 5 | 8 | 3 | 0 |
| 10011 | 18 | 21 | 3 | 1 |
| 10100 | 28 | 24 | 27 | 0 |
| 10101 | 13 | 23 | 10 | 1 |
| 10110 | 7 | 18 | 11 | 1 |
| 10111 | 9 | 22 | 13 | 0 |
| 11000 | 14 | 12 | 29 | 0 |
| 11001 | 10 | 7 | 28 | 1 |
| 11010 | 26 | 10 | 15 | 1 |
| 11011 | 19 | 20 | 1 | 0 |
| 11100 | 22 | 27 | 5 | 1 |
| 11101 | 21 | 30 | 9 | 0 |
| 11110 | 11 | 5 | 25 | 0 |
| 11111 | 20 | 16 | 27 | 1 |

Note that $S_T-S_L=3$ occurs twice, as well as $$S_T-S_L=27$$

In both instances, however, the parity check bit given in the last column can specify which of the two error patterns has occurred. One check pattern suitable for combining the information bits and parity bits into a suitable message grouping is as follows (Table 12):

*Table 12*

BIT NUMBER IN MESSAGE

| | 1 | 6 | 11 | 16 | 21 | 26 | 31 |
|---|---|---|---|---|---|---|---|
| C | 11111 | 11111 | 11111 | 11111 | 11111 | 11111 | 1 |
| $p_4$ | 10101 | 11011 | 00011 | 11100 | 11010 | 01000 | 0 |
| $p_3$ | 01010 | 11101 | 10001 | 11110 | 01101 | 00100 | 0 |
| $p_2$ | 00101 | 01110 | 11000 | 11111 | 00110 | 10010 | 0 |
| $p_1$ | 00010 | 10111 | 01100 | 01111 | 10011 | 01001 | 0 |
| $p_0$ | 00001 | 01011 | 10110 | 00111 | 11001 | 10100 | 1 |
| $\rho_4$ | 10110 | 10100 | 01110 | 11111 | 00100 | 11000 | 0 |
| $\rho_3$ | 01011 | 01010 | 00111 | 01111 | 10010 | 01100 | 0 |
| $\rho_2$ | 00101 | 10101 | 00011 | 10111 | 11001 | 00110 | 0 |
| $\rho_1$ | 00010 | 11010 | 10001 | 11011 | 11100 | 10011 | 0 |
| $\rho_0$ | 00001 | 01101 | 01000 | 11101 | 11110 | 01001 | 1 |
| Information bits | 1 | 6 | 11 | 16 | ---------- | 20 | ---- |
| Check bits | ------- | ------- | ------- | C | $k_4k_3k_2k_1k_0$ | $\pi_4\pi_3\pi_2\pi_1$ | $\pi_0$ |

Figure 9:
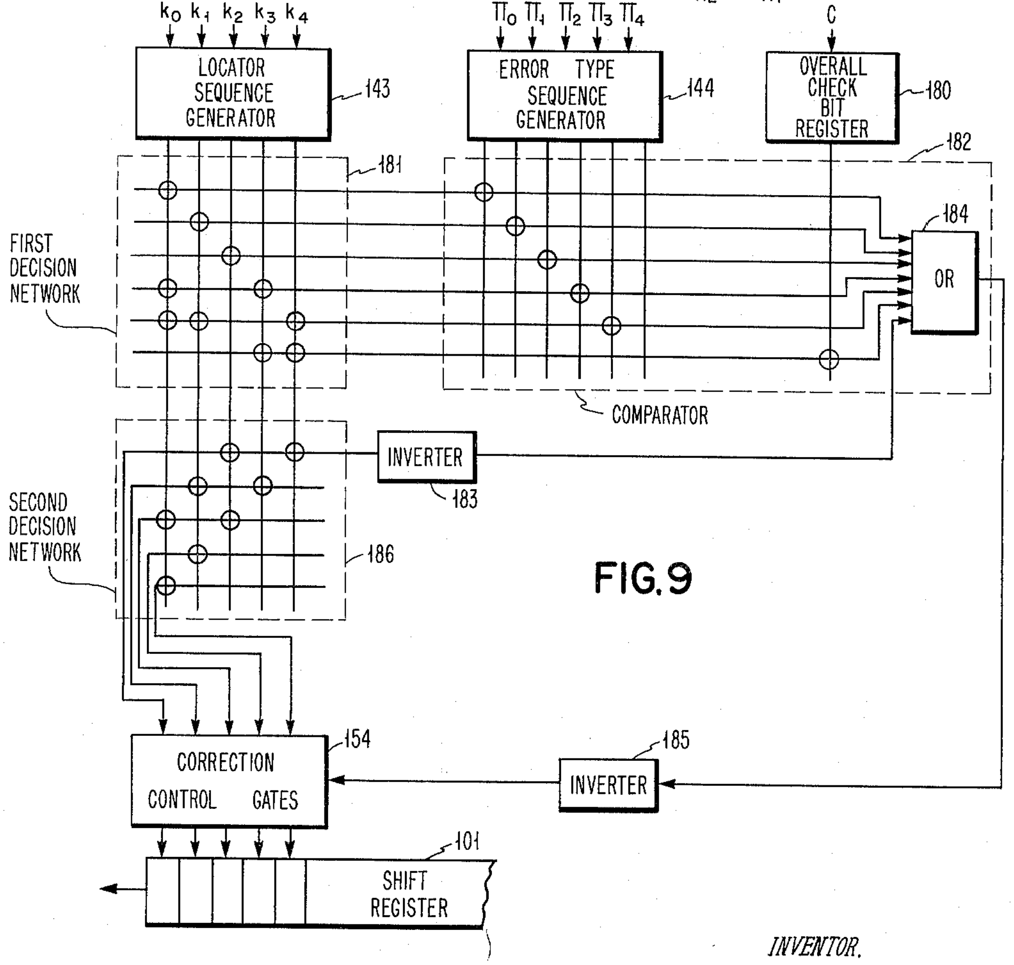
FIG. 9 is a simplified diagram of an error correcting means useful in other systems in accordance with the invention.

Error correcting means suitable for operating with this error correcting code and message grouping are shown in FIG. 9. Here again a circle about a crosspoint in a decision network means that the signal on the vertical through the crosspoint is one of the terms in a sum modulo 2 which is defined by all the circled crosspoints on the horizontal. Elements like those of FIGS. 5 and 8 are similarly numbered.

In this arrangement, output signals from the first decision network 181 are compared bit by bit to those from the error type sequence generator 144 and the overall check bit register 180 in a comparator 182. The comparator 182 includes modulo 2 adders and an OR circuit 184 to which is also coupled an inverter 183 deriving signals from a second decision network 186 which generates the proper correction code for the error burst. Because the comparator 182 is set to provide recognition when the bit by bit comparisons are not all equal, signals from the OR circuit 184 are applied to the correction control gates 154 through an inverter 185.

The step-by-step operation of this circuit is like that generally described in conjunction with FIG. 5. The comparison between the output signals from the first decision network 181 and the special line from the second decision network 186 with the signals from the error type sequence generator 144 and the overall check bit register 180 tests for concurrent identification of the same error pattern. The faulty burst of data in the shift register is concurrently shifted into the position at which it may be corrected. Upon recognition of the error pattern the output signals from the second decision network 186 are those needed to correct the error burst by modulo 2 addition, so that the data is then fully correct. Subsequently, the data is recirculated to its original position so that the next message may then be shifted in.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for correcting error bursts in a code group consisting of data bits and at least two different types of parity bit subwords arranged in different selected m-sequence relationships to the data bits, including the combination of means responsive to the code group for circulating the bits in the code group, means separately responsive to the code group for generating separate check-sum subwords determined by the two selected m-sequences, means for cycling the check-sum subwords through their m-sequence states in a direction opposite to the direction of circulation of the code group, means responsive to the m-sequences for comparing indicated error patterns established by the m-sequences at each individual state thereof, means responsive to the comparing means for correcting the code group upon identification of the location and nature of an error pattern, and means coupled to the means for circulating the code group for completing the circulation following the correction of the code group.

2. A system for correcting error bursts in a code group consisting of data bits and at least two different types of parity bit subwords arranged in different selected m-sequence relationships to the data bits, including the combination of shift register means responsive to the code group for recirculating the bits in the code group in successive steps, means separately responsive to m-sequence check-sum representations of the parity bit subwords for generating successive m-sequence states, the m-sequence states changing oppositely to the direction of recirculation of the code group, means responsive to the m-sequence states for comparing possible error patterns established by the m-sequences, to identify error patterns and locations by selected relationship of the m-sequence states, means responsive to the comparing means for correcting the code group at a selected stage of the recirculation determined by the m-sequence states, and means coupled to the shift register means for completing the recirculation to the original position following the correction of the code group.

3. A system for correcting errors occurring in a code group made up of data bits and a pair of parity bit subwords, each of the parity bit subwords being related to the data bits and to the other parity bit subwords in a selected and different m-sequence, including the combination of a recirculating register for storing and shifting the bits of the code group, first m-sequence generator means for providing a first check-sum subword, established from the code group in accordance with a first m-sequence, second m-sequence generator means for providing a second parity bit subword, established from the code group in accordance with the second m-sequence, means responsive to the check-sum subwords established from the code group for determining the presence of an error, means responsive to the determination of the presence of an error for cycling the register and the m-sequence generator means in successive steps in opposite directions, code conversion means coupled to at least one of the m-sequence generator means for generating error patterns which might be maintained as a possible final state for selected positions in the code group, means responsive to the code conversion means and to the m-sequence generator means for determining the location and type of an error pattern by like concurrent indicated error patterns from the m-sequence generator means, count correction means coupled to selected stages of the recirculating register for correcting the error pattern, and means coupled to the recirculating register for continuing the circulation of the code group until the corrected code group is in its original position in the register.

4. A system for correcting errors occurring in a code group made up of data bits and a pair of parity bit subwords, each of the parity bit subwords being related to the data bits and to the other parity bit subwords according to a selected and different m-sequence, the system including the combination of a recirculating register for storing and shifting the bits of the code group, first and second means generating first and second check-sums respectively, each of the check-sums being determined from the code group in accordance with the first and second m-sequences respectively, first m-sequence generator means for shifting the first check-sum through successive states in accordance with the first m-sequence, second m-sequence generator means for shifting the second check-sum through successive states in accordance with the second m-sequence, means responsive to the initial states of the first and second check-sums for determining the presence of an error burst in the code group, means responsive to the determination of the presence of the error burst for cycling the register and the m-sequence generator means in successive steps in opposite directions, code conversion means coupled to at least one of the m-sequence generator means for generating error burst patterns representing one possible final state for one of the m-sequences, means responsive to the code conversion means and to the m-sequence generator means for identifying the error burst pattern through concurrent indication of like error burst patterns by the m-sequence generator means, count correction means coupled to selected stages of the recirculating register for correcting the error burst pattern at a step in circulation of the data group determined by the identification of the error burst pattern and means coupled to the recirculating register for continuing the circulation of the code group until the corrected code group is in its original position.

5. The invention as set forth in claim 4 above, wherein the code conversion means is formed of two code conversion networks, a first of which is coupled to a first m-sequence generator means, and a second of which code conversion networks is coupled to the first code conversion network, and which system includes comparator means coupled between the second code conversion network and the second m-sequence generator means.

6. In combination with an information handling system having a source of binary coded multibit data signals and a device for utilizing said signals, an error detecting and correcting system interconnecting the data source and the utilization device and operable to detect, locate and correct a plurality of different types of related errors occurring during the translation of the data signals to the device, the error correcting system including an encoder, a decoder and signal translating means connected therebetween, the encoder comprising means for supplying to the signal translating means a code group signal consisting of a predetermined number of data bits, a predetermined number of locator parity bits, and a predetermined number of error type parity bits, the locator parity bits being generated from bit positions of the code group signal determined by a first m-sequence and the error type parity bits being generated from bit positions determined by a second m-sequence, the decoder comprising means for generating first and second check-sums from the code group signal as received over bit positions determined by the m-sequences, recirculating register means for receiving the code group signal, first and second m-sequence generator means for receiving the first and second check-sums respectively, means coupled to the recirculating register means and to the first and second m-sequence generator means for successively shifting the recirculating register means and the first and second m-sequence generator means in opposite directions, and means responsive to the first and second m-sequence generator means and coupled to the recirculating register means for correcting an identified type of related error at a selected step in the shifting of the code group signal, as determined by the first and second m-sequence generator means.

7. The invention as set forth in claim 6 above, wherein the means for correcting an identified type of related error includes means for relating the first and second check-sums to possible error burst correction patterns for predetermined fixed positions in the recirculating register means, as established by the then-existing states of the first and second m-sequence generator means.

8. In combination with an information system having a source of binary coded multibit data signals which are subject to different types of related errors in translation to a data decoder, the data signals being arranged in code groups consisting of a predetermined number of data bits, a predetermined number of locator parity bits and a predetermined number of error type parity bits, the locator parity bits and the error type parity bits being arranged from bit positions of the code group signal determined by a first m-sequence and a second m-sequence respectively, the decoder comprising means for generating locator check-sum bits from the code group signal as received over bit positions determined by the first m-sequence, means for generating error type check-sum bits from the code group signal as received over bit positions determined by the second m-sequence, a shift register for receiving the code group signal in its entirety, a locator sequence generator for receiving the locator check-sum bits, an error type sequence generator for receiving the error type check-sum bits, means coupled to the shift register and to the sequence generators for shifting the shift register forward and the sequence generators in reverse in successive steps, code conversion means coupled to at least one of the sequence generators for generating a possible error pattern which one of the sequence generators might have as a final state with relation to selected stages of the shift register, comparator means responsive to the possible error pattern and to the state of the other sequence generator for establishing equality between the possible error patterns indicated by the sequence generators at that selected step, and data correction means coupled to the selected stages of the shift register and responsive to the comparator means and to the generator error patterns for correcting the errors in the code group.

9. The invention as set forth in claim 8 above, wherein the m-sequences are characterized by one of the m-sequences having as many different possible final states as there are code group bits, and the other m-sequence having a different remainder from the first m-sequence for each different error pattern.

10. In combination with an information system having a source of binary coded multibit data signals which are subject to different types of related errors in translation to a data decoder, the data signals being arranged in code groups consisting of a predetermined number of data bits, a predetermined number of locator parity bits and a predetermined number of error type parity bits, the locator parity bits and the error type parity bits being arranged from bit positions of the code group signal determined by a first m-sequence and a second m-sequence respectively, the first m-sequence having different and unique possible final states for a selected position in the code group, and the pattern shifts of the first and second m-sequences being different for each related type of error, the decoder comprising means for generating locator check-sum bits from the code group signal as received over bit positions determined by the first m-sequence, means for generating error type check-sum bits from the code group signal as received over bit positions determined by the second m-sequence, a shift register for receiving the code group signal on its entirety, a locator sequence generator coupled to receive the locator check-sum bits, and error type sequence generator coupled to receive the error type check-sum bits, each of the sequence generators being shiftable through the states of the related m-sequence, means coupled to the shift register and to the sequence generators for shifting the code group shift register in one direction and the sequence generators in the opposite direction, first code conversion means coupled to the locator sequence generator for generating a possible error correction pattern which might exist as a final state for the state of the locator sequence generator relative to predetermined and fixed stages of the shift register, second code conversion means responsive to the possible error correction pattern for generating the state which the error type sequence generator would have with the given possible error pattern, comparator means responsive to the second code conversion means and to the error type sequence generator, for determining the step at which a true error pattern is identified, and data correction means coupled to the selected stages of the shift register and responsive to the comparator means and to the first code conversion means for correcting the errors in the code group.

11. An error burst correcting digital system including encoder means providing a serial code group with two parity bit subwords inserted at different positions determined in accordance with first and second cyclic codes, a decoder, a data translating device subject to distortion interconnecting the encoder and the decoder, the decoder including shift register means, means for shifting received code groups and check digits progressively through the shift register means, means for generating first and second check-sum codes from the full code group received at the decoder, means for shifting the check-sum codes through the cyclic code sequences concurrently with the shifting in the shift register means, and means coupled to the shift register means and responsive to the check-sum codes for correcting errors in the code group in accordance with the states of the check-sum codes during the shifting.

References Cited by the Examiner

UNITED STATES PATENTS

| | | | |
|---|---|---|---|
| 2,956,124 | 10/1960 | Hagelbarger | 178—23 X |
| 3,037,697 | 6/1962 | Kahn | 235—153 |
| 3,069,657 | 12/1962 | Green et al. | 340—171 |
| 3,123,803 | 3/1964 | De Lisle et al. | 340—146.1 |

OTHER REFERENCES

Fire: A Class of Multiple-Error Connecting Binary Codes For Non-Independent Errors, Technical Report No. 55, April 24, 1959, pp. 42 to 46.

Woxencraft et al.; Sequential Recovering, Massachusetts Institute, 1961, pp. 45, 46.

MALCOLM A. MORRISON, *Primary Examiner.*